(12) United States Patent
Ikarashi

(10) Patent No.: US 10,748,454 B2
(45) Date of Patent: Aug. 18, 2020

(54) SECRET COMPUTATION APPARATUS, METHOD FOR THE SAME, AND PROGRAM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 151 days.

(21) Appl. No.: 15/745,278

(22) PCT Filed: Jul. 20, 2016

(86) PCT No.: PCT/JP2016/071214
§ 371 (c)(1),
(2) Date: Jan. 16, 2018

(87) PCT Pub. No.: WO2017/014224
PCT Pub. Date: Jan. 26, 2017

(65) Prior Publication Data
US 2018/0218650 A1 Aug. 2, 2018

(30) Foreign Application Priority Data
Jul. 22, 2015 (JP) ................................ 2015-144550

(51) Int. Cl.
*G09C 1/00* (2006.01)
*H04L 9/00* (2006.01)

(52) U.S. Cl.
CPC ................ *G09C 1/00* (2013.01); *H04L 9/008* (2013.01); *H04L 2209/46* (2013.01)

(58) Field of Classification Search
CPC ........ G09C 1/00; H04L 2209/46; H04L 9/008
(Continued)

(56) References Cited

U.S. PATENT DOCUMENTS

2013/0304780 A1* 11/2013 Ikarashi ................. H04L 9/085
708/250
2017/0061833 A1* 3/2017 Joye ..................... H04L 9/0847
(Continued)

FOREIGN PATENT DOCUMENTS

EP 2 669 878 A1 12/2013

OTHER PUBLICATIONS

Extended European Search Report dated Feb. 18, 2019 in European Patent Application No. 16827784.6, 7 pages.
(Continued)

*Primary Examiner* — Brandon S Hoffman
*Assistant Examiner* — Nega Woldemariam
(74) *Attorney, Agent, or Firm* — Oblon, McClelland, Maier & Neustadt, L.L.P.

(57) ABSTRACT

An assigned share which is a proper subset of a subshare set with a plurality of subshares as elements, and meta information indicating values according to the elements of the subshare set or indicating that the elements are concealed values are stored. When a value according to a provided corresponding value according to a subset of the assigned share is not obtained from the meta information, a provided value according to the provided corresponding value obtained from the subset of the assigned share is outputted. When a value according to an acquired corresponding value according to a subset of an external assigned share, which is a proper subset of the subshare set, is not obtained from the meta information, input of an acquired value according to the acquired corresponding value is accepted. When the acquired value is inputted, a secret share value is obtained at least using the acquired value.

12 Claims, 12 Drawing Sheets

(58) Field of Classification Search
USPC .......................................................... 713/189
See application file for complete search history.

(56) References Cited

U.S. PATENT DOCUMENTS

| | | | |
|---|---|---|---|
| 2017/0278433 A1* | 9/2017 | Furukawa | ................ G09C 1/00 |
| 2018/0139045 A1* | 5/2018 | Furukawa | ................ G09C 1/00 |
| 2018/0276417 A1* | 9/2018 | Cerezo Sanchez | ....... G06F 8/41 |
| 2018/0357933 A1* | 12/2018 | Takashima | ............... G09C 1/00 |

OTHER PUBLICATIONS

Sheikh, R. et al. "Privacy-Preserving k-Secure Sum Protocol", (IJCSIS) International Journal of Computer Science and Information Security, XP055553756, vol. 6, No. 2, 2009, pp. 184-188.

Nair, D. G. et al. "An Effective Private Data storage and Retrieval System using Secret sharing scheme based on Secure Multi-party Computation", International Conference on Data Science & Engineering (ICDSE), XP032692484, 2014, pp. 210-214.

International Search Report dated Aug. 16, 2016, in PCT/JP2016/071214 filed Jul. 20, 2016.

Dai Ikarashi, et al., "Secure Database Operations Using an Improved 3-party Verifiable Secure Function Evaluation", The 2011 Symposium on Cryptography and Information Security, Jan. 25-28, 2011, 9 pages (with Partial English Translation).

Koki Hamada, et al., "A Batch Mapping Algorithm for Secure Function Evaluation", IEICE Technical Report, vol. 112, No. 126, Jul. 2012, 7 pages.

European Office Action dated Oct. 23, 2019 in Patent Application No. 16 827 784.6, 7 pages.

\* cited by examiner

SECRET COMPUTATION APPARATUS, METHOD FOR THE SAME, AND PROGRAM

CROSS-REFERENCE TO RELATED APPLICATIONS

This application is a 371 of international application PCT/JP2016/071214, filed in Japan on Jul. 20, 2016, which claims priority to JP 2015-144550, filed in Japan on Jul. 22, 2015, the contents of each of which are incorporated by reference in their entirety.

TECHNICAL FIELD

The present invention relates to a technical field of secret computation.

BACKGROUND ART

A technique of performing secret computation based on replicated secret sharing is known (for example, see Non-patent Literature 1).

PRIOR ART LITERATURE

Non-Patent Literature

Non-patent literature 1: Dai Ikarashi, Koji Chida, Koki Hamada, Katsumi Takahashi, "Secure Database Operations Using An Improved 3-party Verifiable Secure Function Evaluation", InSCIS2011, 2011.

SUMMARY OF THE INVENTION

Problems to be Solved by the Invention

There is a scheme in which values are transferred among a plurality of secret computation apparatuses, and each secret computation apparatus performs secret computation using values received from the other secret computation apparatuses. In such a scheme, there may be a case where each secret computation apparatus can acquire a part of values to be received from the other secret computation apparatuses in advance. In such a case, it is inefficient to transfer all the values among the secret computation apparatuses.

A subject of the present invention is to improve efficiency of the scheme in which each secret computation apparatus performs secret computation using values received from other secret computation apparatuses.

Means to Solve the Problems

In order to obtain a secret share value of an operation result according to an input value, which is a function value of a plurality of subshares, a secret computation apparatus stores an assigned share which is a proper subset of a subshare set with a plurality of subshares as elements, and meta information indicating values according to the elements of the subshare set or indicating that the elements are concealed values. If a value according to a provided corresponding value according to a subset of the assigned share is not obtained from the meta information, the secret computation apparatus outputs a provided value according to the provided corresponding value obtained from the subset of the assigned share. If a value according to an acquired corresponding value according to a subset of an external assigned share, which is a proper subset of the subshare set, is not obtained from the meta information, the secret computation apparatus accepts input of an acquired value according to the acquired corresponding value. If the acquired value is inputted, the secret computation apparatus obtains a secret share value at least using the acquired value.

Effects of the Invention

Thereby, it is possible to improve efficiency of the scheme in which each secret computation apparatus performs secret computation using values received from other secret computation apparatuses.

DETAILED DESCRIPTION OF THE EMBODIMENTS

Figure 1:
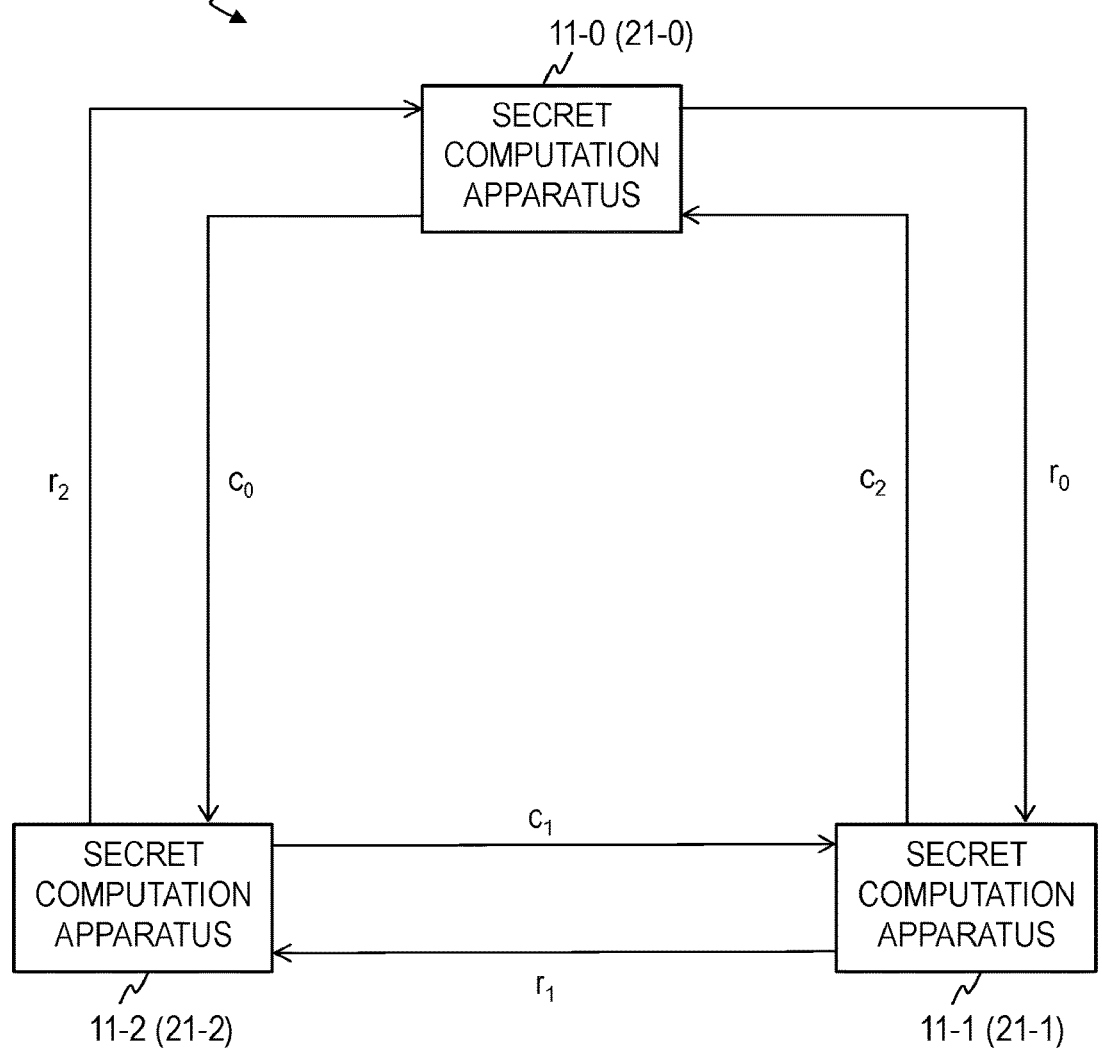
FIG. 1 is a block diagram illustrating a functional configuration of a secret computation system of an embodiment.

Embodiments of the present invention will be described below.

[Summary]

In secret computation of the embodiments, each of a plurality of secret computation apparatuses obtains a secret share value of an operation result according to "an input value". Here, "the input value" is secretly shared in accordance with a replicated secret sharing scheme. That is, "the input value" is a function value of a plurality of subshares (for example, an addition value, an addition/subtraction value or the like), and a proper subset of "a subshare set" with the plurality of the subshares as elements is assigned to each secret sharing apparatus as a share (a secret share value of "the input value"). However, there may be a case where values according to a part of the subshares are already known to each secret sharing apparatus. For example, a case where the value according to the part of subshares have been already acquired by secret computation performed in the past, a case where the values according to the part of the subshares are public information, and the like correspond to that case. "A value according to $\alpha$" may be $\alpha$ itself or may be a function value of $\alpha$. "The value according to $\alpha$" is, for example, a value corresponding to α. "The operation result according to an input value" may be the input value itself or may be a function value of the input value. According to such a situation, "meta information" indicating values according to elements of "the subshare set" or indicating that the elements are concealed values is set. Elements for which "the values according to the elements" are represented by "the meta information" can be identified from "the meta information". Elements for which it is indicated by "the meta information" that "the elements are concealed values" cannot be identified from "the meta information". In each secret computation apparatus, "an assigned share" and "the meta information" are stored. When a value according to "a provided corresponding value" according to a subset of "the assigned share" is not obtained from "the meta information", the secret computation apparatus outputs "a provided value" according to "the provided corresponding value" obtained from the subset of "the assigned share" to the other secret computation apparatuses. "The provided corresponding value according to the subset" may be the subset itself or may be a function value of the subset. "The provided value according to the provided corresponding value" may be the provided corresponding value themselves or may be a function value of the provided corresponding value. On the other hand, when the value according to "the provided corresponding value" is obtained from "the meta information", the secret computation apparatus does not have to output "the provided value" to the other secret computation apparatuses. Further, when a value according to "an acquired corresponding value" according to a subset of "an external assigned share", which is a proper subset of "the subshare set", is not obtained from "the meta information", "an acquired value" according to "the acquired corresponding value" is inputted to the secret computation apparatus. "The external assigned share" means a share assigned to another secret computation apparatus. "The acquired corresponding value according to the subset" may be the subset itself or may be a function value of the subset. "The acquired value according to the acquired corresponding value" may be the acquired corresponding value itself or may be a function value of the acquired corresponding value. On the other hand, when the value according to "the acquired corresponding value" is obtained from "the meta information", "the acquired value" does not have to be inputted to the secret computation apparatus. When "the acquired value" is inputted, the secret computation apparatus obtains "the secret share value as the operation result according to the input value" using at least "the acquired value". Thereby, it is possible to reduce the number of times of transferring values among the secret computation apparatuses and improve efficiency.

For example, in the case of obtaining secret share values of an operation result according to "the input value" and "a second input value", a process as shown below is performed. In this case, "the second input value" is also secretly shared in accordance with the replicated secret sharing scheme similarly to "the input value". That is, "the second input value" is a function value of a plurality of second subshares, and a proper subset of "a second subshare set" with the plurality of second subshares as elements is assigned to each secret sharing apparatus as a second share (a secret share value of "the second input value"). However, there may be a case where values according to a part of the second subshares are already known to each secret sharing apparatus. According to such a situation, "second meta information" indicating values according to elements of "the second subshare set" or indicating that the elements are concealed values is set. Elements for which "the values according to the elements" are represented by "the second meta information" can be identified from "the second meta information". Elements for which it is indicated by "the second meta information" that "the elements are concealed values" cannot be identified from "the second meta information". In each secret computation apparatus, "a second assigned share" and "the second meta information" are stored. When a value according to "a provided corresponding value" according to the subset of "the assigned share" and a subset of "the second assigned share" is not obtained from "the meta information" and "the second meta information, the secret computation apparatus outputs "a provided value" according to "the provided corresponding value" obtained from the subset of "the assigned share" and the subset of "the second assigned share" to the other secret computation apparatuses. When a value according to "all acquired corresponding value" according to the subset of "the external assigned share" which is a proper subset of "the subshare set" and a subset of "a second external assigned share" which is a proper subset of "the second subshare set" is not obtained from "the meta information" and "the second meta information", "an acquired value" according to "the acquired corresponding value" is inputted to the secret computation apparatus. Further, when "the acquired value" is inputted, the secret computation apparatus obtains "the secret share values of the operation result according to the input value and the second input value" using at least "the acquired value".

When the scheme described above is applied to multiplication, "an operation result" is a multiplication result ab between an input value a and a second input value b, and three secret computation apparatuses perform secret computation of the multiplication ab. The input value a satisfies $a=a_{0P}+a_{1P}+a_{2P}$ for subshares $a_{0P}, a_{1P}, a_{2P}$, and the second input value b satisfies $b=b_{0P}+b_{1P}+b_{2P}$ for second subshares $b_{0P}, b_{1P}, b_{2P}$. The secret computation apparatus stores an assigned share $(a_{0P}, a_{1P})$ which is a proper subset of a subshare set $(a_{0P}, a_{1P}, a_{2P})$, meta information A indicating values according to elements of the subshare set $(a_{0P}, a_{1P}, a_{2P})$ or indicating that the elements are concealed values, a second assigned share $(b_{0P}, b_{1P})$ which is a proper subset of a second subshare set $(b_{0P}, b_{1P}, b_{2P})$, and second meta information B indicating values according to elements of the second subshare set $(b_{0P}, b_{1P}, b_{2P})$ or indicating that the elements are concealed values. When a value according to a provided corresponding value $a_{0P}b_{1P}+a_{1P}b_{0P}$ is not obtained from the information A and B, the secret computation apparatus performs communication for sharing a first arbitrary value $r_P$ with an external secret computation apparatus (a first secret computation apparatus). Otherwise, the communication for sharing the first arbitrary value $r_P$ is unnecessary. When a value according to $a_{2P}b_{0P}+a_{0P}b_{2P}$ is not obtained from the information A and B, the secret computation apparatus performs communication for sharing a second arbitrary value $r_{P-}$ with an external secret computation apparatus (a second secret computation apparatus). Otherwise, the communication for sharing the second arbitrary value $r_{P-}$ is unnecessary. The lower subscript "P" corresponds to the present secret computation apparatus; the lower subscript "P+" corresponds to the first secret computation apparatus; and the lower subscript "P−" corresponds to the second secret computation apparatus. When the value according to the provided corresponding value $a_{0P}b_{1P}+a_{1P}b_{0P}$ is not obtained from the meta information A and B, the secret computation apparatus outputs a provided value $c_P:=a_{0P}b_{1P}+a_{1P}b_{0P}+r_P$. When a value according to an acquired corresponding value $a_{1P}b_{2P}+a_{2P}b_{1P}$ is not obtained from the meta information A and B, the secret computation apparatus accepts input of an acquired value $c_{P+}$. Here, $c_{P+}:=a_{1P}b_{2P}+a_{2P}b_{1P}+r_{P+}$ is satisfied. Otherwise, the above communications are unnecessary. Here, "α:=β" means to define that α is β (that is, to set the value of β to α). The secret computation apparatus sets $c'_P:=c_P$ when the value according to the provided corresponding value $a_{0P}b_{1P}+a_{1P}b_{0P}$ is not obtained from the meta information A and B, and sets $c'_P:=0$ when $c'_P:=c_P$ is not set. The secret computation apparatus sets $c'_{P+}:=c_{P+}$ when the value according to the acquired corresponding value $a_{1P}b_{2P}+a_{2P}b_{1P}$ is not obtained from the meta information A and B, and sets $c'_{P+}:=0$ when $c'_{P+}:=c_{P+}$ is not set. Further, the secret computation apparatus sets $r'_P:=r_P$ when the value according to the provided corresponding value $a_{0P}b_{1P}+a_{1P}b_{0P}$ is not obtained from the meta information A and B, and sets $r'_P:=0$ when $r'_P:=r_P$ is not set. The secret computation apparatus sets $r'_{P-}:=r_{P-}$ when the value according to $a_{2P}b_{0P}+a_{0P}b_{2P}$ is not obtained from the meta information A and B, and sets $r'_{P-}:=0$ when $r'_{P-}:=r_{P-}$ is not set. Furthermore, the secret computation apparatus obtains $c_{0P}:=a'_{0P}b'_{1P}+c'_P-r_{P-}$ when the value according to $a_{2P}b_{0P}+a_{0P}b_{2P}$ is not obtained from the meta information A and B and/or, the secret computation apparatus obtains $c_{0P}:=a'_{0P}b'_{1P}+c'_P-r_{P-}$ when a value according to $a_{0P}b_{0P}+a_{0P}b_{1P}+a_{1P}b_{0P}$ is not obtained from the meta information A and B; and the secret computation apparatus obtains $c_{1P}:=a'_{1P}b'_{1P}+c'_{P+}-r'_P$ when the value according to $a_{0P}b_{1P}+a_{1P}b_{0P}$ is not obtained from the meta information A and B and/or, the secret computation apparatus obtains $c_{1P}:=a'_{1P}b'_{1P}+c'_{P+}-r_P$ when a value according to $a_{1P}b_{1P}+a_{1P}b_{2P}+a_{2P}b_{1P}$ is not obtained from the meta information A and B. Here, $a'_{0P}$, $a'_{1P}$, $b'_{0P}$ and $b'_{1P}$ are values according to $a_{0P}$, $a_{1P}$, $b_{0P}$ and $b_{1P}$, respectively. Further, $c_{0P}$ and $c_{1P}$ are secret share values of the multiplication result ab. When a value according to $a_{2P}b_{0P}+a_{0P}b_{2P}$ and $a_{0P}b_{0P}+a_{0P}b_{1P}+a_{1P}b_{0P}$ is obtained from the meta information A and B, restoration of the operation result ab is possible without $c_{0P}$. In this case, operation of $c_{0P}$ can be omitted. Further, when a value according to $a_{0P}b_{1P}+a_{1P}b_{0P}$ and $a_{1P}b_{1P}+a_{1P}b_{2P}+a_{2P}b_{1P}$ is obtained from the meta information A and B, restoration of the operation result ab is possible without $c_{1P}$. In this case, operation of $c_{1P}$ can be omitted.

More specifically, for example, the secret computation apparatus sets $C_{0P}:=\bot$ when the value according to $a_{0P}b_{0P}+a_{0P}b_{1P}+a_{1P}b_{0P}$ is not obtained from the meta information A and B, and, when the value according to $a_{0P}b_{0P}+a_{0P}b_{1P}+a_{1P}b_{0P}$ is obtained from the meta information A and B, obtains the value according to $a_{0P}b_{0P}+a_{0P}b_{1P}+a_{1P}b_{0P}$ from the meta information A and B and sets the value as $C_{0P}$. Further, for example, the secret computation apparatus sets $C_{1P}:=\bot$ when the value according to $a_{1P}b_{1P}+a_{1P}b_{2P}+a_{2P}b_{1P}$ is not obtained from the meta information A and B, and, when the value according to $a_{1P}b_{1P}+a_{1P}b_{2P}+a_{2P}b_{1P}$ is obtained from the meta information A and B, obtains the value according to $a_{1P}b_{1P}+a_{1P}b_{2P}+a_{2P}b_{1P}$ from the meta information A and B and sets the value as $C_{1P}$. Furthermore, for example, the secret computation apparatus sets $C_{2P}:=\bot$ when a value according to $a_{2P}b_{2P}+a_{2P}b_{o_r}+a_{o_r}b_{2P}$ is not obtained from the meta information A and B, and, when the value according to $a_{2P}b_{2P}+a_{2P}b_{0P}+a_{0P}b_{2P}$ is obtained, obtains the value according to $a_{2P}b_{2P}+a_{2P}b_{0P}+a_{0P}b_{2P}$ from the meta information A and B and sets the value as $C_{2P}$. In this case, $C_{0P}$, $C_{1P}$, $C_{2P}$ are meta information about secret share values of the multiplication result ab. In the case of $C_{0P}:=\bot$, the secret share values of the multiplication result ab include $c_{0P}$; and, in the case of $C_{1P}:=\bot$, the secret share values of the multiplication result ab include $c_{1P}$. As described above, it is possible to reduce the number of times of transferring values among the secret computation apparatuses and the number of times of transferring the secret share values at the time of restoration and improve efficiency. Furthermore, in the case of omitting operation of $c_{0P}$ or $c_{1P}$, it is also possible to reduce the amount of operation in the secret computation apparatuses.

Further, for example, when the meta information A indicates a value according to $a_{0P}$, $a'_{0P}$ is the value indicated by the meta information A. When the meta information A indicates a value according to $a_{1P}$, $a'_{1P}$ is the value indicated by the meta information A. When the meta information B indicates a value according to $b_{0P}$, $b'_{0P}$ is the value indicated by the meta information B. When the meta information B indicates a value according to $b_{1P}$, $b'_{1P}$ is the value indicated by the meta information B. Here, when a condition that the amount of data of the value according to $a_{0P}$ indicated by the meta information A is smaller than the amount of data of $a_{0P}$ (a condition 1-1), and/or the amount of data of the value according to $a_{1P}$ indicated by the meta information A is smaller than the amount of data of $a_{1P}$ (a condition 1-2), and/or the amount of data of the value according to $b_{0P}$ indicated by the meta information B is smaller than the amount of data of $b_{0P}$ (a condition 1-3), and/or the amount of data of the value according to $b_{1P}$ indicated by the meta information B is smaller than the amount of data of $b_{1P}$ (a condition 1-4) is satisfied, it is possible to reduce the amount of operation more than the case of using shares.

In the case of applying the scheme described before to product-sum operation, "the operation result" is an operation result $\Sigma_{n\in\{0,\ldots,N-1\}}a(n)b(n)$ between an input value $\{a(0),\ldots,a(N-1)\}$ and a second input value $\{b(0),\ldots,b(N-1)\}$ ($n\in\{0,\ldots,N-1\}$, $N\geq 1$), and secret computation of the operation $\Sigma_{n\in\{0,\ldots,N-1\}}a(n)b(n)$ is performed by three secret computation apparatuses. Here, a(n) satisfies $a(n)=a_{0P}(n)+a_{1P}(n)+a_{2P}(n)$ for subshares $a_{0P}(n)$, $a_{1P}(n)$, $a_{2P}(n)$, and b(n) satisfies $b(n)=b_{0P}(n)+b_{1P}(n)+b_{2P}(n)$ for second subshares $b_{0P}(n)$, $b_{1P}(n)$, $b_{2P}(n)$. Here, "$\Sigma_{n\in\{0,\ldots,N-1\}}\alpha(n)$" indicates "$\alpha(0)+\ldots+\alpha(N-1)$". That is, "$\Sigma_{n\in\{0,\ldots,N-1\}}\alpha(n)$" indicates:

$$\sum_{n=0}^{N-1}\alpha(n) \qquad \text{[Formula 1]}$$

The secret computation apparatus stores an assigned share $(a_{0P}(n), a_{1P}(n))$ which is a proper subset of a subshare set $(a_{0P}(n), a_{1P}(n), a_{2P}(n))$, meta information A indicating values according to elements of the subshare set $(a_{0P}(n), a_{1P}(n), a_{2P}(n))$ or indicating that the elements are concealed values, a second assigned share $(b_{0P}, b_{1P})$ which is a proper subset of a second subshare set $(b_{0P}(n), b_{1P}(n), b_{2P}(n))$, and second meta information B indicating values according to elements of the second subshare set $(b_{0P}(n), b_{1P}(n), b_{2P}(n))$ or indicating that the elements are concealed values. When a value according to a provided corresponding value $\Sigma_{n\in\{0,\ldots,N-1\}}\{a_{0P}(n)b_{1P}(n)+a_{1P}(n)b_{0P}(n)\}$ is not obtained from the meta information A and B, the secret computation apparatus performs communication for sharing a first arbitrary value $r_P$ with an external secret computation apparatus (a first secret computation apparatus). Otherwise, the communication for sharing the first arbitrary value $r_P$ is unnecessary. When a value according to $\Sigma_{n\in\{0,\ldots,N-1\}}\{a_{2P}(n)b_{0P}(n)+a_{0P}(n)b_{2P}(n)\}$ is not obtained from the meta information A and B, the secret computation apparatus performs communication for sharing a second arbitrary value $r_{P-}$ with an external secret computation apparatus (a second secret computation apparatus). Otherwise, the communication for sharing the second arbitrary value $r_{P-}$ is unnecessary. The secret computation apparatus outputs the provided value $c_P := \Sigma_{n \in \{0, \ldots, N-1\}} \{a_{0P}(n)b_{1P}(n) + a_{1P}(n)b_{0P}(n)\} + r_P$ when the value according to the provided corresponding value $\Sigma_{n \in \{0, \ldots, N-1\}} \{a_{0P}(n)b_{1P}(n) + a_{1P}(n)b_{0P}(n)\}$ is not obtained from the meta information A and B, and accepts input of an acquired value $c_P$, when a value according to an acquired corresponding value $\Sigma_{n \in \{0, \ldots, N-1\}} \{a_{1P}(n)b_{2P}(n) + a_{2P}(n)b_{1P}(n)\}$ is not obtained from the meta information A and B. Here, $c_{P+} := \Sigma \Sigma_{n \in \{0, \ldots, N-1\}} \{a_{1P}b_{2P} + a_{2P}b_{1P}\} + r_{P+}$ is satisfied. Otherwise, the above communications are unnecessary. The secret computation apparatus sets $c'_P := c_P$ when the value according to the provided corresponding value $\Sigma_{n \in \{0, \ldots, N-1\}} \{a_{0P}(n)b_{1P}(n) + a_{1P}(n)b_{0P}(n)\}$ is not obtained from the meta information A and B, and sets $c'_P := 0$ when $c'_P := c_P$ is not set. The secret computation apparatus sets $c'_{P+} := c_{P+}$ when the value according to the acquired corresponding value $\Sigma_{n \in \{0, \ldots, N-1\}} \{a_{1P}(n)b_{2P}(n) + a_{2P}(n)b_{1P}(n)\}$ is not obtained from the meta information A and B, and sets $c'_{P+} := 0$ when $c'_{P+} := c_{P+}$ is not set. Further, the secret computation apparatus sets $r'_P := r_P$ when the value according to the provided corresponding value $\Sigma_{n \in \{0, \ldots, N-1\}} \{a_{0P}(n)b_{1P}(n) + a_{1P}(n)b_{0P}(n)\}$ is not obtained from the meta information A and B, and sets $r'_P := 0$ when $r'_P := r_P$ is not set. The secret computation apparatus sets $r'_{P-} := r'_{P-}$ when the value according to $\Sigma_{n \in \{0, \ldots, N-1\}} \{a_{2P}(n)b_{0P}(n) + a_{0P}(n)b_{2P}(n)\}$ is not obtained from the meta information A and B, and sets $r'_{P-} := 0$ when $r'_{P-} := r_{P-}$ is not set. Furthermore, the secret computation apparatus obtains $c_{0P} := \Sigma_{n \in \{0, \ldots, N-1\}} a'_{0P}(n)b'_{1P}(n) + c'_P - r'_{P-}$ when the value according to $\Sigma_{n \in \{0, \ldots, N-1\}} \{a_{2P}(n)b_{0P}(n) + a_{0P}(n)b_{2P}(n)\}$ is not obtained from the meta information A and B and/or, the secret computation apparatus obtains $c_{0P} := \Sigma_{n \in \{0, \ldots, N-1\}} a'_{0P}(n)b'_{1P}(n) + c'_P - r'_{P-}$ when a value according to $\Sigma_{n \in \{0, \ldots, N-1\}} \{a_{0P}(n)b_{0P}(n) + a_{0P}(n)b_{1P}(n) + a_{1P}(n)b_{0P}(n)\}$ is not obtained from the meta information A and B. The secret computation apparatus obtains $c_{1P} := \Sigma_{n \in \{0, \ldots, N-1\}} a'_{1P}(n)b'_{1P}(n) + c'_{P+} - r'_P$ when the value according to $\Sigma_{n \in \{0, \ldots, N-1\}} \{a_{0P}(n)b_{1P}(n) + a_{1P}(n)b_{0P}(n)\}$ is not obtained from the meta information A and B and/or, the secret computation apparatus obtains $c_{1P} := \Sigma_{n \in \{0, \ldots, N-1\}} a'_{1P}(n)b'_{1P}(n) + c'_{P+} - r'_P$ when a value according to $\Sigma_{n \in \{0, \ldots, N-1\}} \{a_{1P}(n)b_{1P}(n) + a_{1P}(n)b_{2P}(n) + a_{2P}(n)b_{1P}(n)\}$ is not obtained from the meta information A and B. Here, $a'_{0P}(n)$, $a'_{1P}(n)$, $b'_{0P}(n)$ and $b'_{1P}(n)$ are values according to $a_{0P}(n)$, $a_{1P}(n)$, $b_{0P}(n)$ and $b_{1P}(n)$, respectively. Further, $c_{0P}$ and $c_{1P}$ are secret share values of the multiplication result $\Sigma_{n \in \{0, \ldots, N-1\}} a(n)b(n)$. When the value according to $\Sigma_{n \in \{0, \ldots, N-1\}} \{a_{2P}(n)b_{0P}(n) + a_{0P}(n)b_{2P}(n)\}$ and $\Sigma_{n \in \{0, \ldots, N-1\}} \{a_{0P}(n)b_{0P}(n) + a_{0P}(n)b_{1P}(n) + a_{1P}(n)b_{0P}(n)\}$ is obtained from the meta information A and B, it is possible to restore the operation result $\Sigma_{n \in \{0, \ldots, N-1\}} a(n)b(n)$ without $c_{0P}$. In this case, operation of $c_{0P}$ can be omitted. Furthermore, when the value according to $\Sigma_{n \in \{0, \ldots, N-1\}} \{a_{0P}(n)b_{1P}(n) + a_{1P}(n)b_{0P}(n)\}$ and $\Sigma_{n \in \{0, \ldots, N-1\}} \{a_{0P}(n)b_{1P}(n) + a_{1P}(n)b_{0P}(n)\}$ and $\Sigma_{n \in \{0, \ldots, N-1\}} \{a_{1P}(n)b_{1P}(n) + a_{1P}(n)b_{2P}(n) + a_{2P}(n)b_{1P}(n)\}$ is obtained from the meta information A and B, it is possible to restore the operation result $\Sigma_{n \in \{0, \ldots, N-1\}} a(n)b(n)$ without $c_{1P}$. In this case, operation of $c_{1P}$ can be omitted.

More specifically, for example, when the value according to $\Sigma_{n \in \{0, \ldots, N-1\}} \{a_{0P}(n)b_{0P}(n) + a_{0P}(n)b_{1P}(n) + a_{1P}(n)b_{0P}(n)\}$ is not obtained from the meta information A and B, the secret computation apparatus sets $C_{0P} := \bot$. For example, when the value according to $\Sigma_{n \in \{0, \ldots, N-1\}} \{a_{0P}(n)b_{0P}(n) + a_{0P}(n)b_{1P}(n) + a_{1P}(n)b_{0P}(n)\}$ is obtained from the meta information A and B, the secret computation apparatus obtains the value according to $\Sigma_{n \in \{0, \ldots, N-1\}} \{a_{0P}(n)b_{0P}(n) + a_{0P}(n)b_{1P}(n) + a_{1P}(n)b_{0P}(n)\}$ and sets the value as $C_{0P}$. For example, when the value according to $\Sigma_{n \in \{0, \ldots, N-1\}} \{a_{1P}(n)b_{1P}(n) + a_{1P}(n)b_{2P}(n) + a_{2P}(n)b_{1P}(n)\}$ is not obtained from the meta information A and B, the secret computation apparatus sets $C_{1P} := \bot$. For example, when the value according to $\Sigma_{n \in \{0, \ldots, N-1\}} \{a_{1P}(n)b_{1P}(n) + a_{1P}(n)b_{2P}(n) + a_{2P}(n)b_{1P}(n)\}$ is obtained from the meta information A and B, the secret computation apparatus obtains the value according to $\Sigma_{n \in \{0, \ldots, N-1\}} \{a_{1P}(n)b_{1P}(n) + a_{1P}(n)b_{2P}(n) + a_{2P}(n)b_{1P}(n)\}$ and sets the value as $C_{1P}$. For example, when a value according to $\Sigma_{n \in \{0, \ldots, N-1\}} \{a_{2P}(n)b_{2P}(n) + a_{2P}(n)b_{0P}(n) + a_{0P}(n)b_{2P}(n)\}$ is not obtained from the meta information A and B, the secret computation apparatus sets $C_{2P} := \bot$. For example, when the value according to $\Sigma_{n \in \{0, \ldots, N-1\}} \{a_{2P}(n)b_{2P}(n) + a_{2P}(n)b_{0P}(n) + a_{0P}(n)b_{2P}(n)\}$ is obtained, the secret computation apparatus obtains the value according to $\Sigma_{n \in \{0, \ldots, N-1\}} \{a_{2P}(n)b_{2P}(n) + a_{2P}(n)b_{0P}(n) + a_{0P}(n)b_{2P}(n)\}$ from the meta information A and B and sets the value as $C_{2P}$. Here, $C_{0P}$, $C_{1P}$, $C_{2P}$ are meta information about the secret share values of the operation result $\Sigma_{n \in \{0, \ldots, N-1\}} a(n)b(n)$. In the case of $C_{0P} := \bot$, the secret share values of the operation result $\Sigma_{n \in \{0, \ldots, N-1\}} a(n)b(n)$ include $c_{0P}$; and, in the case of $C_{1P} := \bot$, the secret share values of the operation result $\Sigma_{n \in \{0, \ldots, N-1\}} a(n)b(n)$ include $c_{1P}$. As described above, it is possible to reduce the number of transferring values among the secret computation apparatuses and the amount of transfer of the secret share values at the time of restoration and improve efficiency. Furthermore, in the case of omitting operation of $c_{0P}$ or $c_{1P}$, it is also possible to reduce the amount of operation in the secret computation apparatus.

Further, for example, when the meta information A indicates a value according to $a_{0P}(n)$, $a'_{0P}(n)$ is the value indicated by the meta information A. When the meta information A indicates a value according to $a_{1P}(n)$, $a'_{1P}(n)$ is the value indicated by the meta information A. When the meta information B indicates a value according to $b_{0P}(n)$, $b'_{0P}(n)$ is the value indicated by the meta information B. When the meta information B indicates a value according to $b_{1P}(n)$, $b'_{0P}(n)$ is the value indicated by the meta information B. Here, when a condition that the amount of data of the value according to $a_{0P}(n)$ indicated by the meta information A is smaller than the amount of data of $a_{0P}(n)$ (a condition 2-1), and/or the amount of data of the value according to $a_{1P}(n)$ indicated by the meta information A is smaller than the amount of data of $a_{1P}(n)$ (a condition 2-2), and/or the amount of data of the value according to $b_{0P}(n)$ indicated by the meta information B is smaller than the amount of data of $b_{0P}(n)$ (a condition 2-3), and/or the amount of data of the value according to $b_{1P}(n)$ indicated by the meta information B is smaller than the amount of data of $b_{1P}(n)$ (a condition 2-4) is satisfied, it is possible to reduce the amount of operation more than the case of using shares.

First Embodiment

In a first embodiment, an example of applying the scheme described above to multiplication will be described.

<Configuration>

Figure 2:
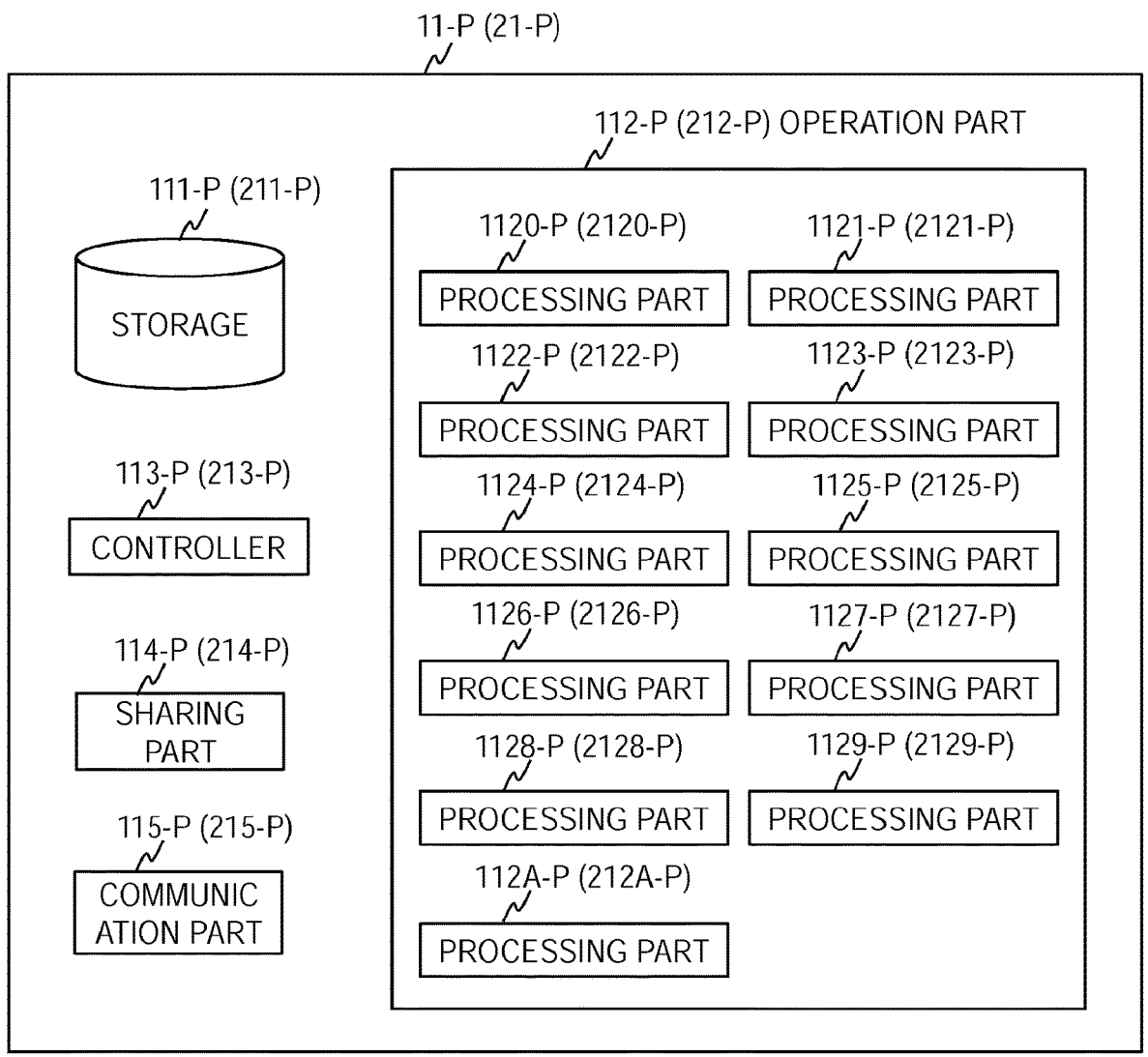
FIG. 2 is a block diagram illustrating a functional configuration of a secret computation apparatus of the embodiment.

As illustrated in FIG. 1, a secret computation system 1 of the present embodiment has three secret computation apparatuses 11-0, 11-1 and 11-2, and these are configured to be communicable via a network such as the Internet. As illustrated in FIG. 2, a secret computation apparatus 11-P (P=0, 1, 2) of the present embodiment has a storage 111-P, an operation part 112-P, a controller 113-P, a sharing part 114-P and a communication part 115-P. The operation part 112-P has processing parts 1120-P to 112A-P. The secret computation apparatus 11-P is configured, for example, by a general-purpose or dedicated computer provided with a processor (a hardware processor) such as a CPU (central processing unit) and a memory such as a RANI (random-access memory) and a ROM (read-only memory), and the like executing a predetermined program. The computer may be provided with one processor and one memory or may be provided with a plurality of processors and memories. The program may be installed into the computer or may be recorded in a ROM or the like in advance. A part or all of the processing parts may be configured not with an electronic circuitry that realizes a functional configuration by a program being read, like the CPU, but with an electronic circuitry that realizes processing functions without using a program. Further, an electronic circuitry constituting one secret computation apparatus 11-$m$ may comprise a plurality of CPUs. Each process executed by the secret computation apparatus 11-P is executed under the control of the controller 113-P, and information obtained by each process is stored into a temporary memory (not shown). The information stored into the temporary memory is read and used as necessary.

<Premises for Processing>

Figure 3:
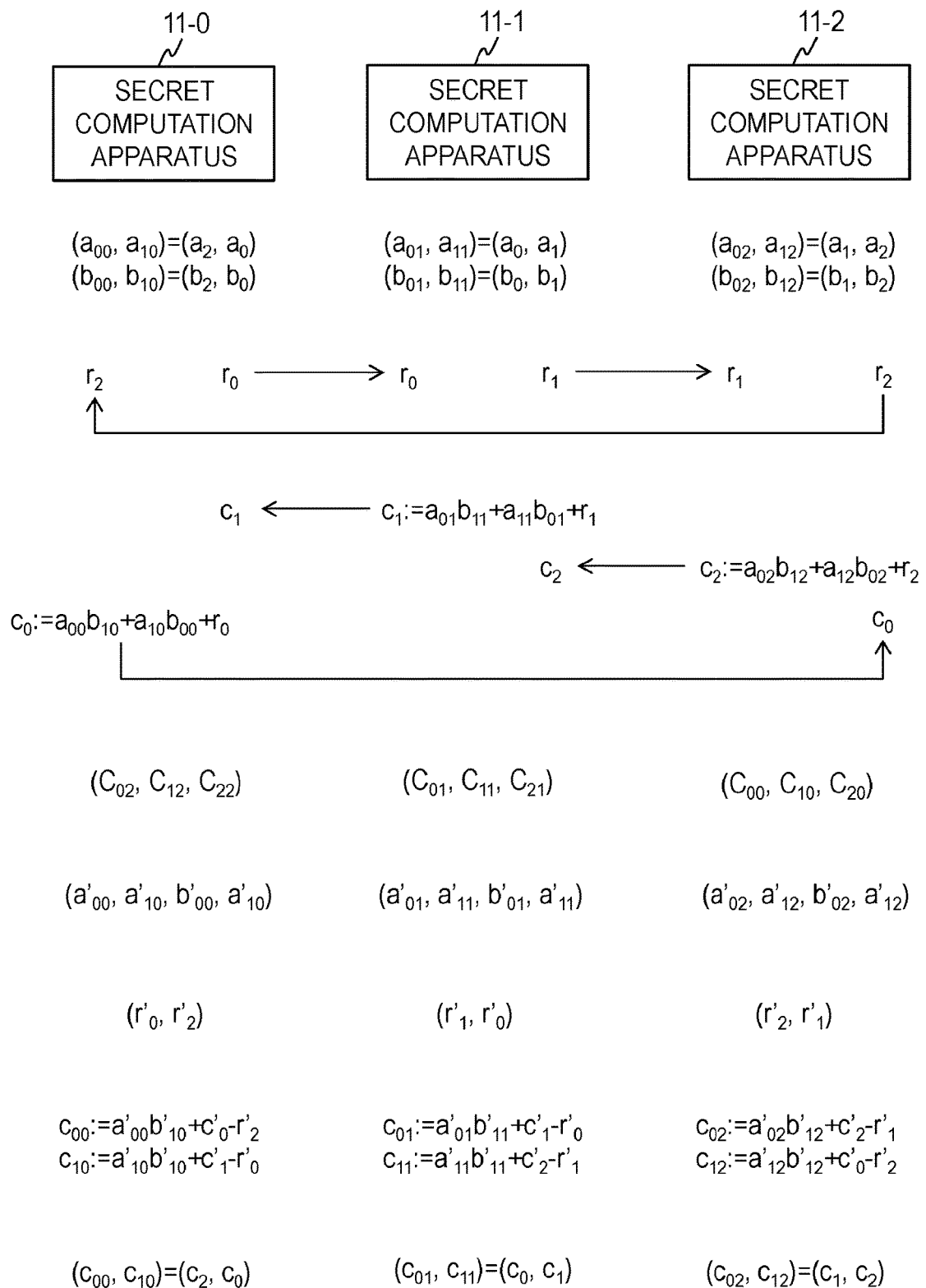
FIG. 3 is a conceptual diagram for illustrating a secret computation method of the embodiment.
Figure 4:
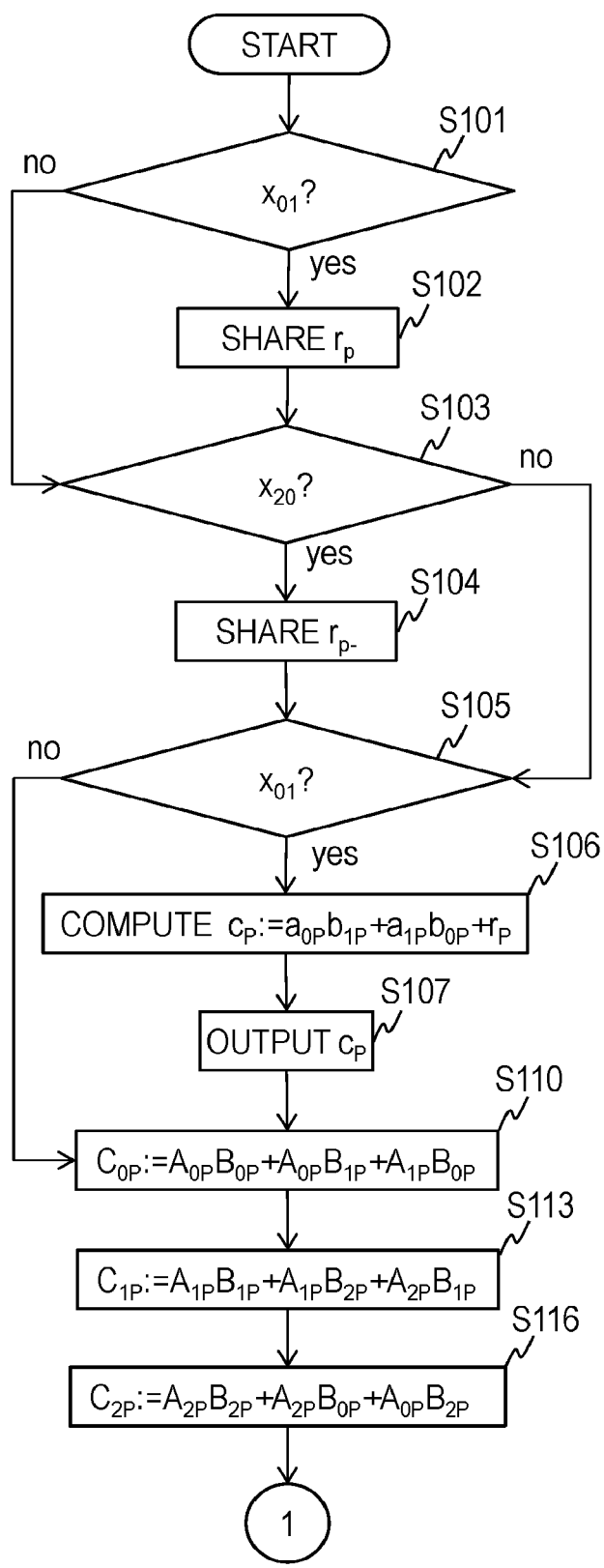
FIG. 4 is a flowchart for illustrating the secret computation method of the embodiment.
Figure 5:
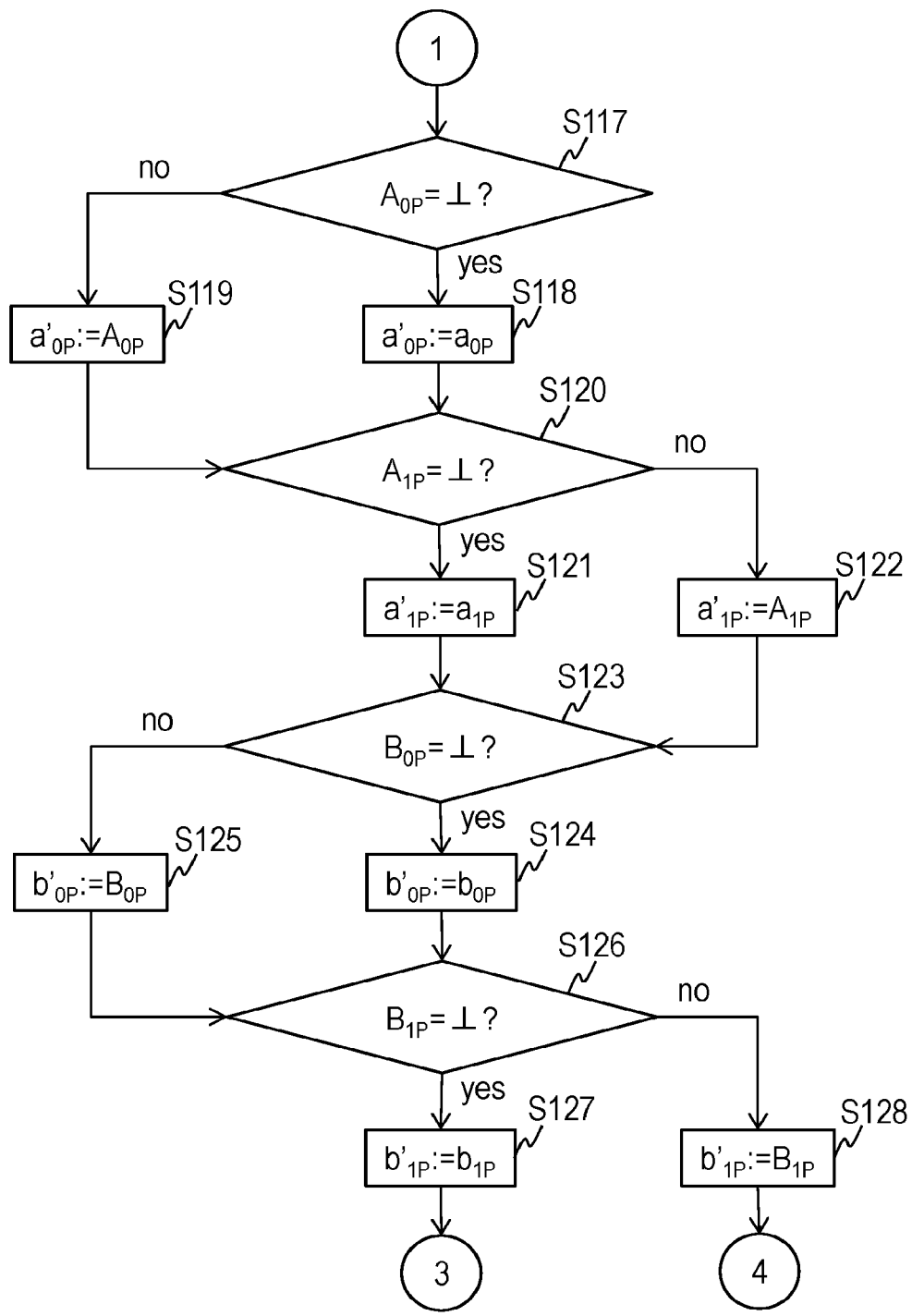
FIG. 5 is the flowchart for illustrating the secret computation method of the embodiment.
Figure 6:
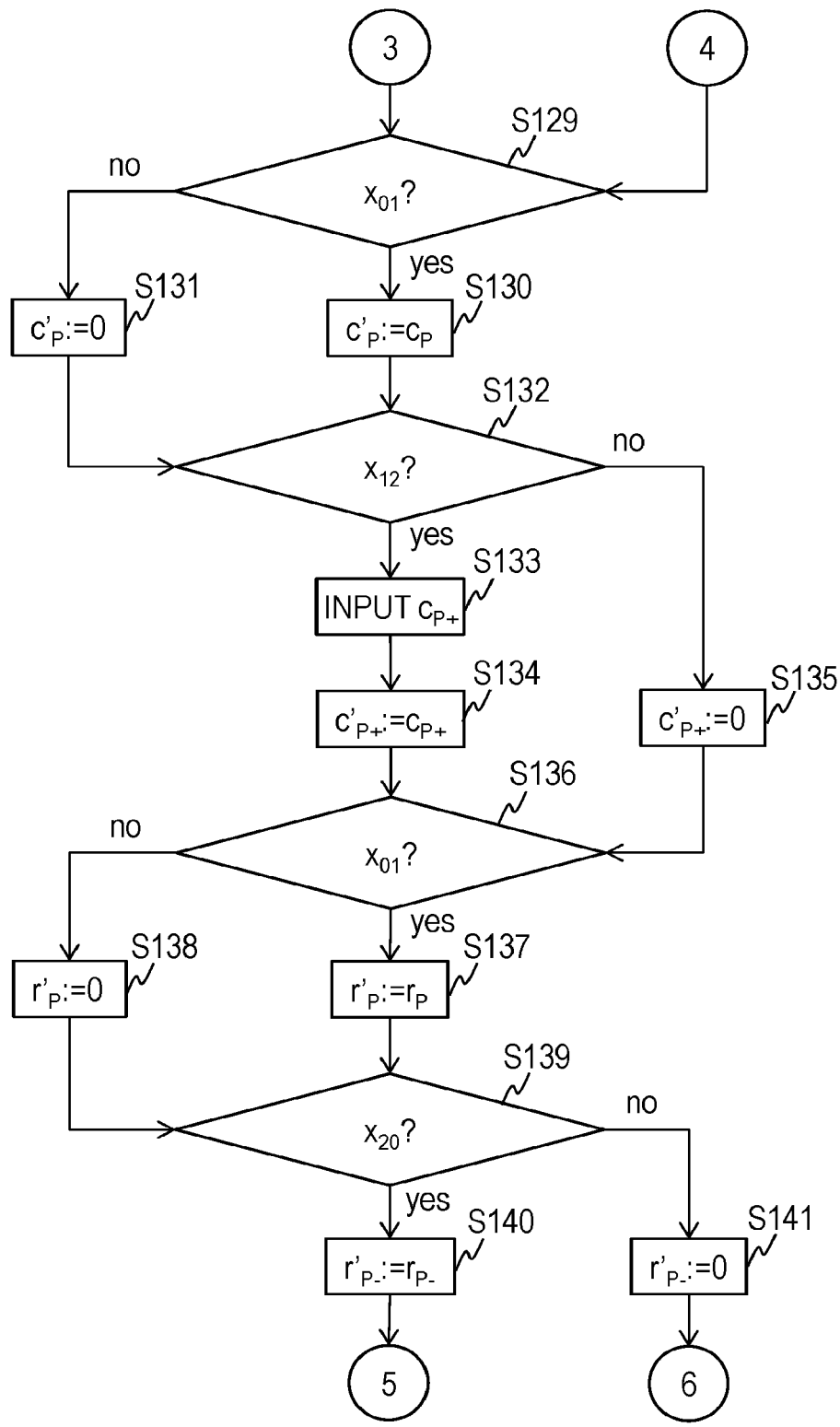
FIG. 6 is the flowchart for illustrating the secret computation method of the embodiment.
Figure 7:
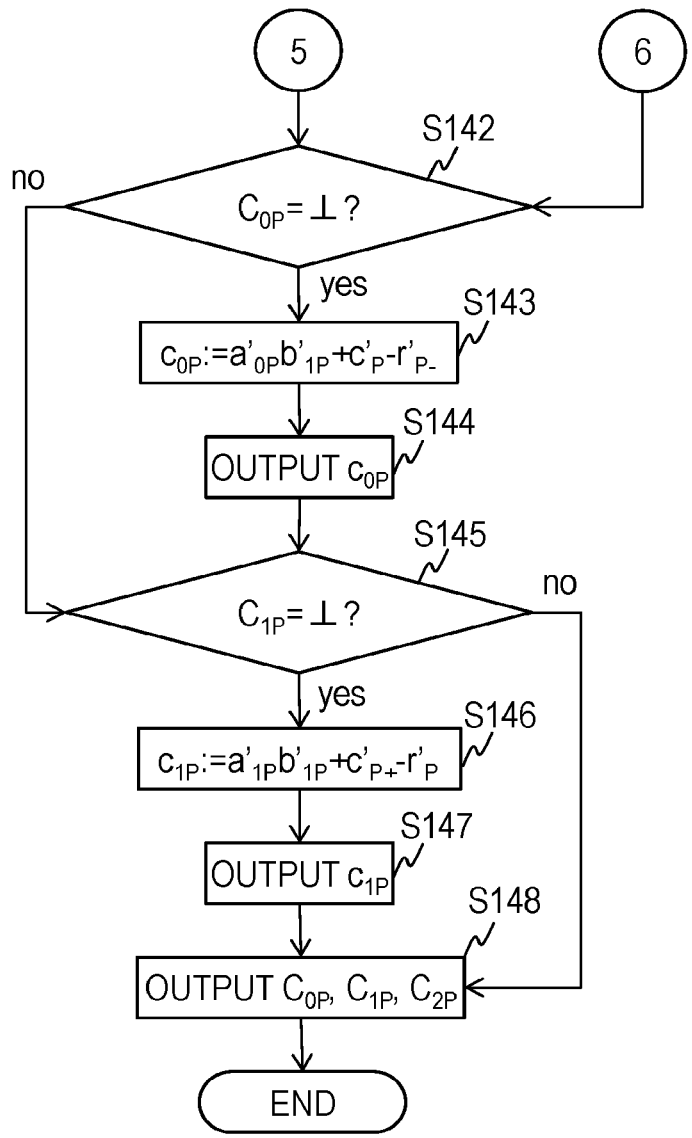
FIG. 7 is the flowchart for illustrating the secret computation method of the embodiment.

In the present embodiment, secret computation of multiplication $ab$ between an input value $a$ and an input value $b$ is performed. The input value $a$ is divided into three subshares $a_1$, $a_2$, $a_3$ satisfying $a=a_1+a_2+a_3$, and the input value $b$ is divided into three subshares $b_1$, $b_2$, $b_3$ satisfying $b=b_1+b_2+b_3$. That is, the input value $a$ is a function value of the subshares $a_1$, $a_2$, $a_3$, and the input value $b$ is a function value of the subshares $b_1$, $b_2$, $b_3$. A share $(a_{0P}, a_{1P})$ (an assigned share), which is a proper subset of a subshare set $(a_{0P}, a_{1P}, a_{2P})$ with three subshares $a_{0P}, a_{1P}, a_{2P}$ as elements, is assigned to each secret computation apparatus 11-P (P=0, 1, 2). Here, $a_{0P}=a_{1(P-1 \bmod 3)}$ and $a_{1P}=a_{0(P+1 \bmod 3)}$ are satisfied. Other proper subsets $(a_{0P}, a_{2P})$ and $(a_{1P}, a_{2P})$ of the subshare set $(a_{0P}, a_{1P}, a_{2P})$ will be called "external assigned shares". Further, a share $(b_{0P}, b_{1P})$ (an assigned share), which is a proper subset of a subshare set $(b_{0P}, b_{1P}, b_{2P})$ with three subshares $b_{0P}, b_{1P}, b_{2P}$ as elements, is assigned to each secret computation apparatus 11-P (P=0, 1, 2). Here, $b_{0P}=b_{1(P-1 \bmod 3)}$ and $b_{1P}=b_{0(P+1 \bmod 3)}$ are satisfied. Other proper subsets $(b_{0P}, b_{2P})$ and $(b_{1P}, b_{2P})$ of the subshare set $(b_{0P}, b_{1P}, b_{2P})$ will be called "external assigned shares". That is, shares $(a_{00}, a_{10})=(a_2, a_0)$ and $(b_{00}, b_{10})=(b_2, b_0)$ are assigned to the secret computation apparatus 11-0, shares $(a_{01}, a_{11})=(a_0, a_1)$ and $(b_{01}, b_{11})=(b_0, b_1)$ are assigned to the secret computation apparatus 11-1, and shares $(a_{02}, a_{12})=(a_1, a_2)$ and $(b_{02}, b_{12})=(b_1, b_2)$ are assigned to the secret computation apparatus 11-2. For the secret computation apparatus 11-P, shares that are not assigned thereto are "the external assigned shares". In the storage 111-P of each secret computation apparatus 11-P (FIG. 2), the shares $(a_{0P}, a_{1P})$ and $(b_{0P}, b_{1P})$ (assigned shares) are stored (FIG. 3). These subshares apparently satisfy relationships of $a=a_{0P}+a_{1P}+a_{2P}$ and $b=b_{0P}+b_{1P}+b_{2P}$.

Meta information A indicating values according to the elements of the subshare set $(a_{0P}, a_{1P}, a_{2P})$ or indicating that the elements are concealed values, and meta information B indicating values according to the elements of the subshare set $(b_{0P}, b_{1P}, b_{2P})$ or indicating that the elements are concealed values are set. "The meta information A indicating values according to elements $a_{JP}$" may indicate values $A_{JP}$ indicating the elements $a_{JP}$ (J=0, 1, 2) (that is, $A_{JP}:=a_{JP}$) or may indicate values $A_{JP}$ that satisfy $a_{JP}=f(A_{JP})$ for a function f that uniquely specifies the elements $a_{JP}$. In the former case, $A_{JP}$ are elements of a set R with values that the input value $a$ can take as elements. In the latter case, $A_{JP}$ are elements of such a domain R' that a range of a function f belongs to the set R. The function f is, for example, a homomorphism function. The amount of data of the elements of the domain R' may be smaller than the amount of data of the elements of the set R. "The meta information A indicating that the elements $a_{JP}$ are concealed values" indicates the values $A_{JP}=\perp$ indicating that the elements $a_{JP}$ (J=0, 1, 2) are concealed values. In the case of $A_{JP}=\perp$, it is not possible to obtain the values of the elements $a_{JP}$ only from the meta information A. Any information that indicates such values $A_{0P}, A_{1P}, A_{2P}$ may be made to be the meta information A. For example, a set $(A_{0P}, A_{1P}, A_{2P})$ with values $A_{0P}, A_{1P}, A_{2P}$ as elements may be made to be the meta information A; one value indicating the set $(A_{0P}, A_{1P}, A_{2P})$ may be made to be the meta information A; or a set of values each of which indicates a subset with a plurality of elements of the set $(A_{0P}, A_{1P}, A_{2P})$ may be made to be the meta information A. The above point similarly applies to the meta information B, and any information that indicates values $B_{0P}, B_{1P}, B_{2P}$ may be made to be the meta information B. Here, $B_{JP}:=b_{JP}$ or $b_{JP}=f(B_{JP})$ or $B_{JP}:=\perp$ is satisfied. If at least one of $A_{0P}, A_{1P}, A_{1P}, B_{0P}, B_{1P}$ and $B_{2P}$ is not "$\perp$", the number of times of transferring values among the secret computation apparatuses 11-P can be reduced. The meta information A and B are stored in the storages 111-P of all the secret computation apparatuses 11-P (P=0, 1, 2).

<Secret Computation Process>

Next, content of a process for secret computation of the present embodiment will be described with the use of FIGS. 3 to 7. Each of the secret computation apparatuses 11-P (P=0, 1, 2) executes the following process.

The sharing part 114-P of the secret computation apparatus 11-P performs processing according to whether $x_{01}$ corresponding to the meta information A and B stored in the storage 111-P is true (T) or false (F). Here, $x_{JK}:=[A_{JP}B_{KP}+A_{KP}B_{JP}=\perp]\in\{T, F\}$ ((J, K)=(0, 1), (1, 2), (2, 0)) is satisfied, and $[A_{JP}B_{KP}+A_{KP}B_{JP}=\perp]$ indicates a truth value indicating whether a proposition that "$A_{JP}B_{KP}+A_{KP}B_{JP}=\perp$ is satisfied" is true (T) or false (F). That "$A_{JP}B_{KP}+A_{KP}B_{JP}=\perp$ is satisfied" means that a value according to $a_{JP}b_{KP}+a_{KP}b_{JP}$ is not obtained from the meta information A and B. If the value according to $a_{JP}b_{KP}$ is not obtained from the meta information A and B ($A_{JP}B_{KP}=\perp$) or the value according to $a_{KP}b_{JP}$ is not obtained from the meta information A and B ($A_{KP}B_{JP}=\perp$), the value according to $a_{JP}b_{KP}+a_{KP}b_{JP}$ is not obtained from the meta information A and B ($A_{JP}B_{KP}+A_{KP}B_{JP}=\perp$). In other words, it is meant that $A_{JP}B_{KP}+A_{KP}B_{JP}=\perp$ is $(A_{JP}B_{KP}=\perp)\vee(A_{KP}B_{JP}=\perp)$. For example, (1) in the case of $A_{JP}, B_{KP}\in R$ or $A_{JP}, B_{KP}\in R'$, $A_{JP}B_{KP}\neq\perp$ is satisfied, and, in the case of $A_{KP}, B_{JP}\in R$ or $A_{KP}, B_{JP}\in R'$, $A_{KP}B_{JP}\neq\perp$ is satisfied. (2) In the case of $A_{JP}=0$, $A_{JP}B_{KP}=0$ and $A_{JP}B_{KP}\neq\perp$ are satisfied irrespective of $B_{KP}$. In the case of $B_{KP}=0$, $A_{JP}B_{KP}=0$ and $A_{JP}B_{KP}\neq\perp$ are satisfied irrespective of A. In the case of $A_{KP}=0$, $A_{KP}B_{JP}=0$ and $A_{KP}B_{JP}\neq\perp$ are satisfied irrespective of B. In the case of $B_{JP}=0$, $A_{KP}B_{JP}=0$ and $A_{KP}B_{JP}\neq\perp$ are satisfied irrespective of $A_{KP}$. (3) In the case of $A_{JP}\neq 0$ and $B_{KP}=\perp$, or in the case of $A_{JP}=\perp\neq 0$ and $B_{KP}\neq 0$, $A_{JP}B_{KP}=\perp$ is satisfied. In the case of $A_{KP}\neq 0$ and $B_{JP}=\perp$, or in the case of $A_{KP}=\perp\neq 0$ and $B_{JP}\neq 0$, $A_{KP}B_{JP}=\perp$ is satisfied (step S101).

If $x_{01}$ is true ($x_{01}=T$) (when a value according to a provided corresponding value $a_{0P}b_{1P}+a_{1P}b_{0P}$ is not obtained from the meta information A and B), the sharing part 114-P performs communication for sharing an arbitrary value $r_P$ with an external secret computation apparatus 11-(P+1 mod 3). The arbitrary value $r_P$ may be a random number, a pseudorandom number or a constant. For example, the sharing part 114-P stores the generated or selected arbitrary value $r_P$ into the storage 111-P and sends it to the communication part 115-P. The communication part 115-P transmits the arbitrary value $r_P$ to the secret computation apparatus 11-(P+1 mod 3). The arbitrary value $r_P$ is inputted to a communication part 115-(P+1 mod 3) of the secret computation apparatus 11-(P+1 mod 3) and stored into a storage 111-(P+1 mod 3) (step S102). After that, the process proceeds to step S103. On the other hand, if $x_{01}$ is false ($x_{01}$=F), the process proceeds to step S103 without executing step S102.

At step S103, the sharing part 114-P performs processing according to whether $x_{20}$ corresponding to the meta information A and B stored in the storage 111-P is true (T) or false (F) (step S103). If $x_{20}$ is true ($x_{20}$=T) (when a value according to a provided corresponding value $a_{2P}b_{0P}+a_{0P}b_{2P}$ is not obtained from the meta information A and B), the sharing part 114-P performs communication for sharing an arbitrary value $r_{P-}:=r_{(P-1 \bmod 3)}$ with an external secret computation apparatus 11-(P−1 mod 3). The arbitrary value $r_{P-}$ may be a random number, a pseudorandom number or a constant. For example, a sharing part 114-(P−1 mod 3) of the secret computation apparatus 11-(P−1 mod 3) stores the generated or selected arbitrary value $r_{P-}$ into a storage 111-(P−1 mod 3) and sends it to a communication part 115-(P−1 mod 3). The communication part 115-(P−1 mod 3) transmits the arbitrary value $r_{P-}$ to the secret computation apparatus 11-P. The arbitrary value $r_{P-}$ is inputted to the sharing part 114-P, and the sharing part 114-P stores the arbitrary value $r_{P-}$ into the storage 111-P (step S104). After that, the process proceeds to step S105. On the other hand, if $x_{20}$ is false ($x_{20}$=F), the process proceeds to step S105 without executing step S104.

At step S105, the processing part 1120-P of the operation part 112-P performs processing according to whether $x_{01}$ corresponding to the meta information A and B stored in the storage 111-P is true (T) or false (F) (step S105). If $x_{01}$ is true ($x_{01}$=T) (when the value according to the provided corresponding value $a_{up}b_{1P}+a_{1P}b_{0P}$ is not obtained from the meta information A and B), the processing part 1120-P reads the shares ($a_{0P}$, $a_{1P}$) and ($b_{0P}$, $b_{1P}$) and the arbitrary value $r_P$ from the storage 111-P; and obtains and outputs a provided value $c_P:=a_{0P}b_{1P}+a_{1P}b_{0P}+r_P$ (step S106). The provided value $c_P$ is transmitted from the communication part 115-P to the external secret computation apparatus 11-(P−1 mod 3). The provided value $c_P$ is inputted to the communication part 115-(P−1 mod 3) of the secret computation apparatus 11-(P−1 mod 3) and stored into the storage 111-(P−1 mod 3) (step S107). After that, the process proceeds to step S110. On the other hand, if $x_{01}$ is false ($x_{01}$=F), the process proceeds to step S110 without executing steps S106 and S107.

At step S110, the processing part 1127-P of the operation part 112-P obtains $C_{0P}:=A_{0P}B_{0P}+A_{0P}B_{1P}+A_{1P}B_{0P}$ from the meta information A and B stored in the storage 111-P and outputs $C_{0P}$ (step S110). Here, when a value according to $a_{0P}b_{0P}+a_{0P}b_{1P}+a_{1P}b_{0P}$ is not obtained from the meta information A and B (in the case of $A_{0P}B_{0P}+A_{0P}B_{1P}+A_{1P}B_{0P}=\perp$), $C_{0P}:=\perp$ is satisfied. In the case of $A_{0P}B_{0P}=\perp$ or $A_{0P}B_{1P}=\perp$ or $A_{1P}B_{0P}=\perp$, $A_{0P}B_{0P}+A_{1P}B_{1P}+A_{1P}B_{0P}=\perp$ is satisfied. On the other hand, when the value according to $a_{0P}b_{0P}+a_{0P}b_{1P}+a_{1P}b_{0P}$ is obtained from the meta information A and B, $C_{0P}$ is the value according to $a_{0P}b_{0P}+a_{0P}b_{1P}+a_{1P}b_{0P}$.

Next, the processing part 1128-P of the operation part 112-P obtains $C_{1P}:=A_{1P}B_{1P}+A_{1P}B_{2P}+A_{2P}B_{1P}$ from the meta information A and B stored in the storage 111-P and outputs $C_{1P}$ (step S113). Here, when a value according to $a_{1P}b_{1P}+a_{1P}b_{2P}+a_{2P}b_{1P}$ is not obtained from the meta information A and B (in the case of $A_{1P}B_{1P}+A_{1P}B_{2P}+A_{2P}B_{1P}=\perp$), $C_{1P}:=\perp$ is satisfied. On the other hand, when the value according to $a_{1P}b_{1P}+a_{1P}b_{2P}+a_{2P}b_{1P}$ is obtained from the meta information A and B, $C_{1P}$ is the value according to $a_{1P}b_{1P}+a_{1P}b_{2P}+a_{2P}b_{1P}$.

Next, the processing part 1128-P of the operation part 112-P obtains $C_{2P}:=A_{2P}B_{2P}+A_{2P}B_{0P}+A_{0P}B_{2P}$ from the meta information A and B stored in the storage 111-P and outputs $C_{2P}$ (step S116). Here, when a value according to $a_{2P}b_{2P}+a_{2P}b_{0P}+a_{0P}b_{2P}$ is not obtained from the meta information A and B ($A_{2P}B_{2P}+A_{2P}B_{0P}+A_{0P}B_{2P}=\perp$), $C_{2P}:=\perp$ is satisfied. On the other hand, when the value according to $a_{2P}b_{2P}+a_{2P}b_{0P}+a_{0P}b_{2P}$ is obtained from the meta information A and B, $C_{2P}$ is the value according to $a_{2P}b_{2P}+a_{2P}b_{0P}+a_{0P}b_{2P}$.

Next, the processing part 112A-P of the operation part 112-P performs processing according to whether $A_{0P}$ corresponding to the meta information A stored in the storage 111-P is true (T) or false (F) (step S117). The processing part 112A-P sets $a'_{0P}:=a_{0P}$ (step S118) if $A_{0P}$ is true ($A_{0P}$=T), and sets $a'_{0P}:=A_{0P}$ (step S119) if $A_{0P}$ is false ($A_{0P}$=F). That is, when the meta information A indicates a value according to $a_{0P}$, $a'_{0P}$ is the value indicated by the meta information A.

Further, the processing part 112A-P performs processing according to whether $A_{1P}$ corresponding to the meta information A stored in the storage 111-P is true (T) or false (F) (step S120). The processing part 112A-P sets $a'_{1P}:=a_{1P}$ (step S121) if $A_{1P}$ is true ($A_{1P}$=T); and sets $a'_{1P}:=A_{1P}$ and outputs $a'_{1P}$ (step S122) if $A_{1P}$ is false ($A_{1P}$=F). That is, when the meta information A indicates a value according to $a_{1P}$, $a'_{1P}$ is the value indicated by the meta information A.

Further, the processing part 112A-P performs processing according to whether $B_{0P}$ corresponding to the meta information B stored in the storage 111-P is true (T) or false (F) (step S123). The processing part 112A-P sets $b'_{0P}:=b_{0P}$ (step S124) if $B_{0P}$ is true ($B_{0P}$=T); and sets $b'_{0P}:=B_{0P}$ and outputs $b'_{0P}$ (step S125) if $B_{0P}$ is false ($B_{0P}$=F). That is, when the meta information B indicates a value according to $b_{0P}$, $b'_{0P}$ is the value indicated by the meta information B.

Next, the processing part 112A-P performs processing according to whether $B_{1P}$ corresponding to the meta information B stored in the storage 111-P is true (T) or false (F) (step S126). The processing part 112A-P sets $b'_{1P}:=b_{1P}$ (step S127) if $B_{1P}$ is true ($B_{1P}$=T); and sets $b'_{1P}:=B_{1P}$ and outputs $b'_{1P}$ (step S128) if $B_{1P}$ is false ($B_{1P}$=F). That is, when the meta information B indicates a value according to $b_{1P}$, $b'_{1P}$ is the value indicated by the meta information B.

The processing part 1121-P of the operation part 112-P performs processing according to whether $x_{10}$ corresponding to the meta information A and B stored in the storage 111-P is true (T) or false (F) (step S129). If $x_{10}$ is true ($x_{10}$=T) (when the value according to the provided corresponding value $a_{0P}b_{1P}+a_{1P}b_{0P}$ is not obtained from the meta information A and B), the processing part 1121-P sets $c'_P:=c_P$ (step S130). Otherwise (when $c'_P:=c_P$ is not set), the processing part 1121-P sets $c'_P:=0$ (step S131) and outputs $c'_P$.

The processing part 1122-P of the operation part 112-P performs processing according to whether $x_{12}$ corresponding to the meta information A and B stored in the storage 111-P is true (T) or false (F) (step S132). If $x_{12}$ is true (T) (when a value according to an acquired corresponding value $a_{1P}b_{2P}+a_{2P}b_{1P}$ is not obtained from the meta information A and B), the acquired value $c_{P+}:=c_{(P+1 \mod 3)}$ have been transmitted from the secret computation apparatus 11-(P+1 mod 3) at step S107 described before. The acquired value $c_{P+}$ is inputted to the processing part 1122-P (step S133). The processing part 1122-P sets and outputs $c'_{P+}:=c_{P+}$ (step S134). On the other hand, if $x_{12}$ is false (F) (when $c'_{P+}:=c_{P+}$ is not set), the processing part 1122-P sets and outputs $c'_{P+}:=0$ (step S135).

The processing part 1123-P of the operation part 112-P performs processing according to whether $x_{01}$ corresponding to the meta information A and B stored in the storage 111-P is true (T) or false (F) (step S136). If $x_{01}$ is true (T) (when the value according to the provided corresponding value $a_{0P}b_{1P}+a_{1P}b_{0P}$ is not obtained from the meta information A and B), the processing part 1122-P sets $r'_P:=r_P$ (step S137). Otherwise (when $r'_P:=r_P$ is not set), the processing part 1122-P sets $r'_P:=0$ (step S138) and outputs $r'_P$.

The processing part 1124-P of the operation part 112-P performs processing according to whether $x_{20}$ corresponding to the meta information A and B stored in the storage 111-P is true (T) or false (F) (step S139). If $x_{20}$ is true (T) (when the value according to $a_{2P}b_{0P}+a_{0P}b_{2P}$ is not obtained from the meta information A and B), the processing part 1124-P sets $r'_{P-}:=r_{P-}$ (step S140). Otherwise (when $r'_{P-}:=r_{P-}$ is not set), the processing part 1124-P sets $r'_{P-}:=0$ (step S141) and outputs $r'P_{-}$.

The processing part 1125-P of the operation part 112-P performs processing according to whether $C_{0P}=\perp$ is satisfied or not (step S142). If $C_{0P}=\perp$ is satisfied, the processing part 1125-P obtains $c_{0P}:=a'_{0P}b'_{1P}+c'_P-r'_{P-}$ (step S143); the operation part 112-P outputs $c_{0P}$ (step S144); and the process proceeds to step S145. $C_{0P}=\perp$ is satisfied when the value according to $a_{2P}b_{0P}+a_{0P}b_{2P}$ is not obtained from the meta information A and B or, $C_{0P}=\perp$ is satisfied when the value according to $a_{0P}b_{0P}+a_{0P}b_{1P}+a_{1P}b_{0P}$ is not obtained from the meta information A and B. On the other hand, if $C_{0P}=\perp$ is not satisfied, the process proceeds to step S145 without executing steps S143 and S144.

At step S145, the processing part 1126-P of the operation part 112-P performs processing according to whether $C_{1P}=\perp$ is satisfied or not (step S145). If $C_{1P}=\perp$ is satisfied, the processing part 1126-P obtains $c_{1P}:=a'_{1P}b'_{1P+}+c'_P-r'_P$ (step S146), and the operation part 112-P outputs $c_{1P}$ (step S147). On the other hand, if $C_{1P}=\perp$ is not satisfied, the process proceeds to step S148 without executing steps S146 and S147.

At step 148, the operation part 112-P outputs $C_{0P}$, $C_{1P}$, $C_{2P}$. Here, $C_{0P}$, $C_{1P}$, $C_{2P}$ are meta information about the secret share values of the operation result ab. Here, $c_{0P}$ and $c_{1P}$ are secret share values of the operation result ab. Here, $c_{0P}$ is required to be outputted only in the case of $C_{0P}:=\perp$, and $c_{1P}$ is required to be outputted only in the case of $C_{1P}:=\perp$.

<Features of the Present Embodiment>

In the present embodiment, it is possible to reduce the number of times of transmission/reception of values among the secret computation apparatuses 11-P according to values indicated by meta information A and B. Further, in the case where operation of a value that is not required to be transmitted or received any more can be omitted, the amount of operation can be also reduced. Furthermore, in the case where the amount of operation using the meta information is smaller than the amount of operation using shares also, it is possible to reduce the amount of operation.

Second Embodiment

In a second embodiment, an example of applying the scheme described above to product-sum operation will be described.

<Configuration>

As illustrated in FIG. 1, a secret computation system 2 of the present embodiment has three secret computation apparatuses 21-0, 21-1 and 21-2, and these are configured to be communicable via a network such as the Internet. As illustrated in FIG. 2, a secret computation apparatus 21-P (P=0, 1, 2) of the present embodiment has a storage 211-P, an operation part 212-P, a controller 213-P, a sharing part 214-P and a communication part 215-P. The operation part 212-P has processing parts 2120-P to 212A-P. The secret computation apparatus 21-P is configured, for example, by the computer described before executing a predetermined program. Each process executed by the secret computation apparatus 21-P is executed under control of the controller 213-P, and information obtained by each process is stored into a temporary memory (not shown). The information stored into the temporary memory is read and used as necessary.

<Premises for Processing>

Figure 8:
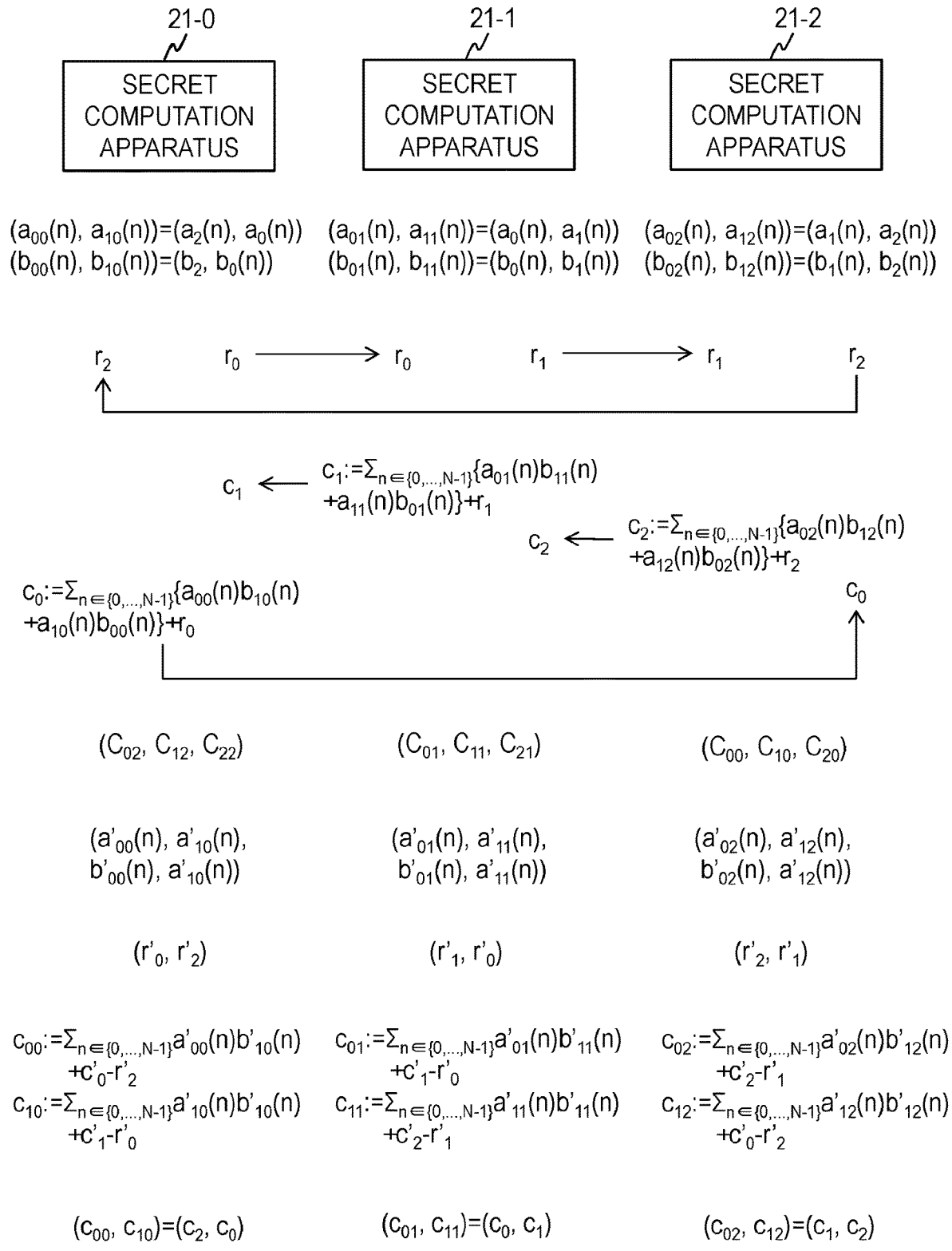
FIG. 8 is a conceptual diagram for illustrating a secret computation method of an embodiment.
Figure 9:
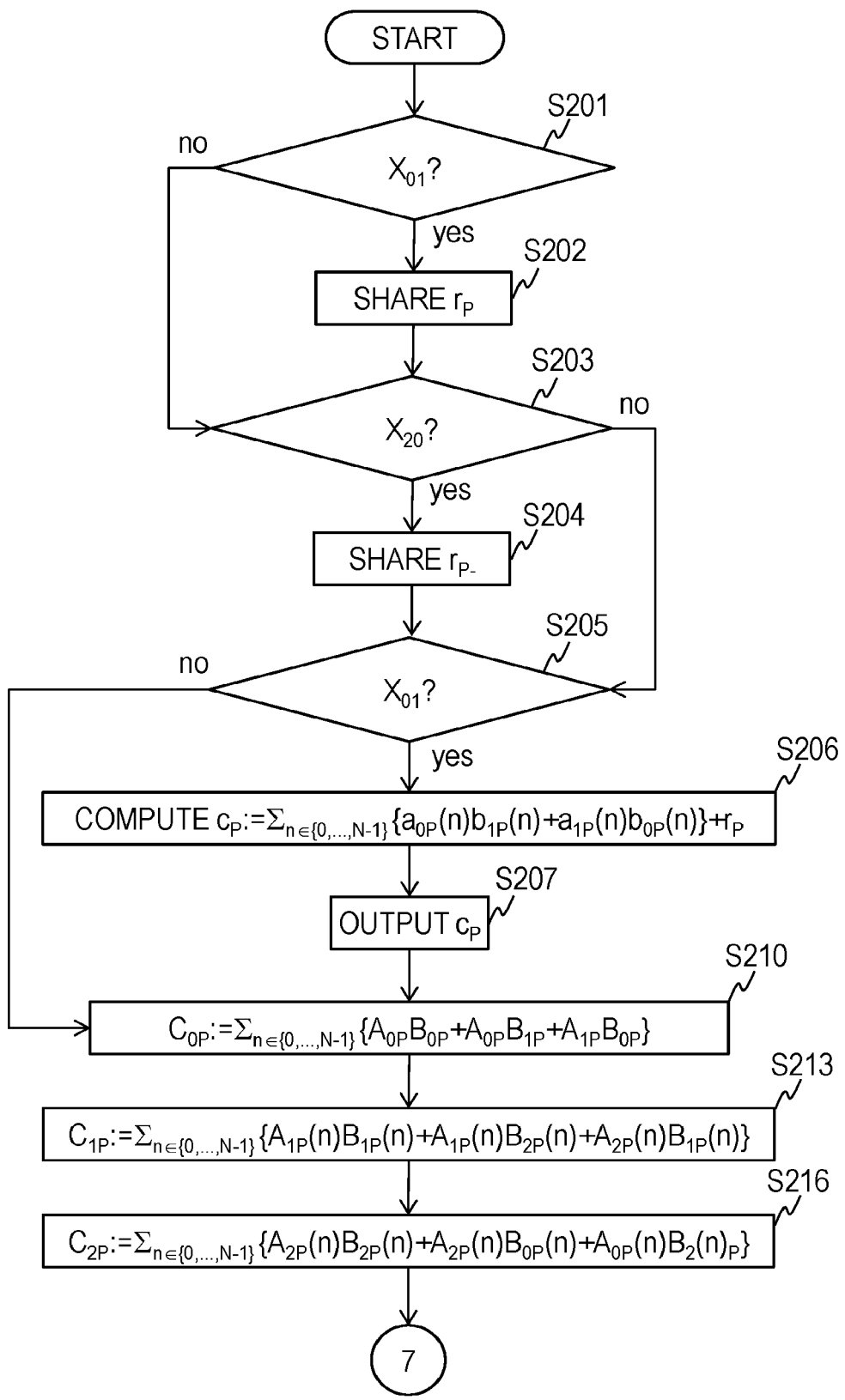
FIG. 9 is a flowchart for illustrating the secret computation method of the embodiment.
Figure 10:
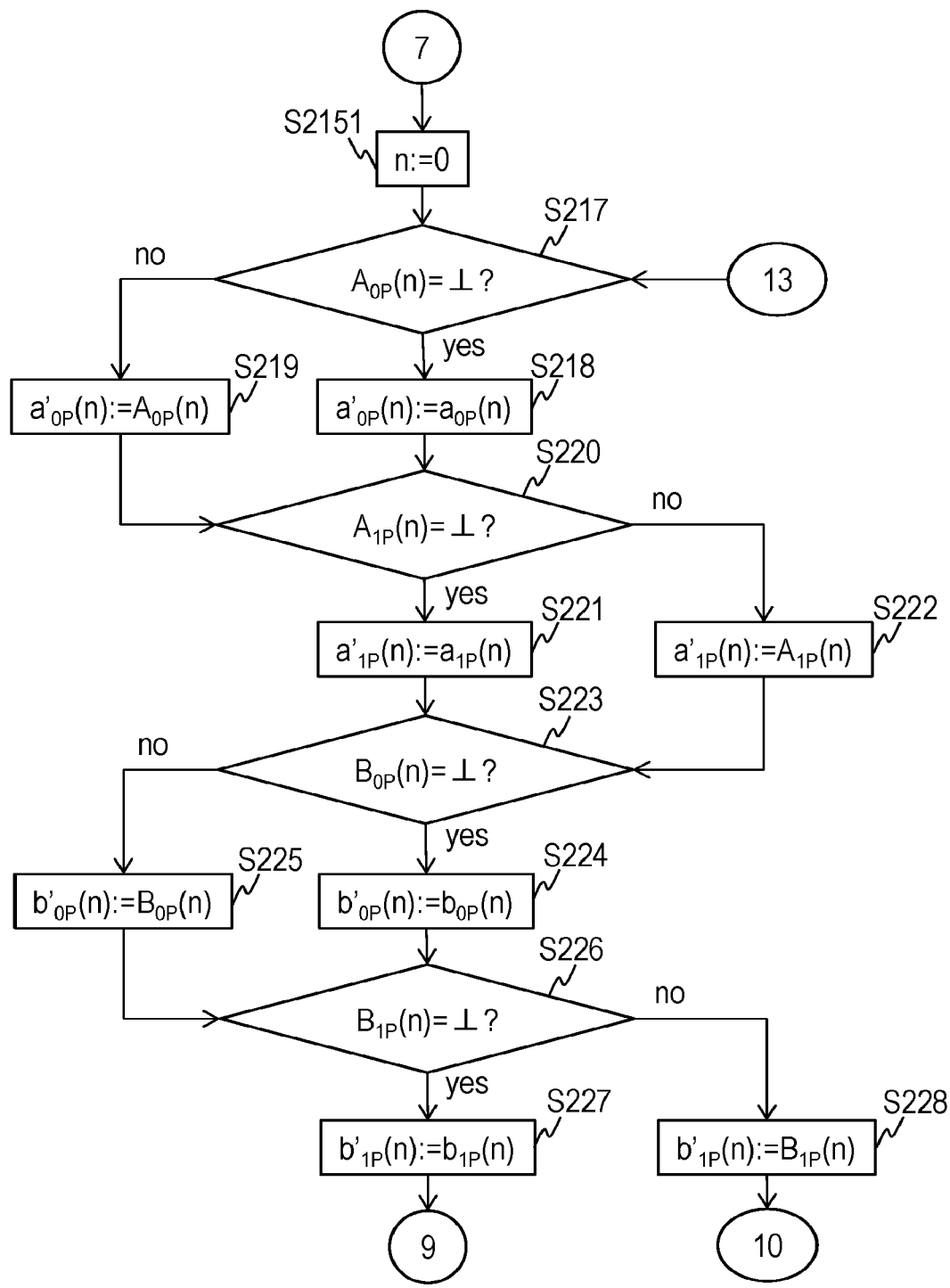
FIG. 10 is the flowchart for illustrating the secret computation method of the embodiment.
Figure 11:
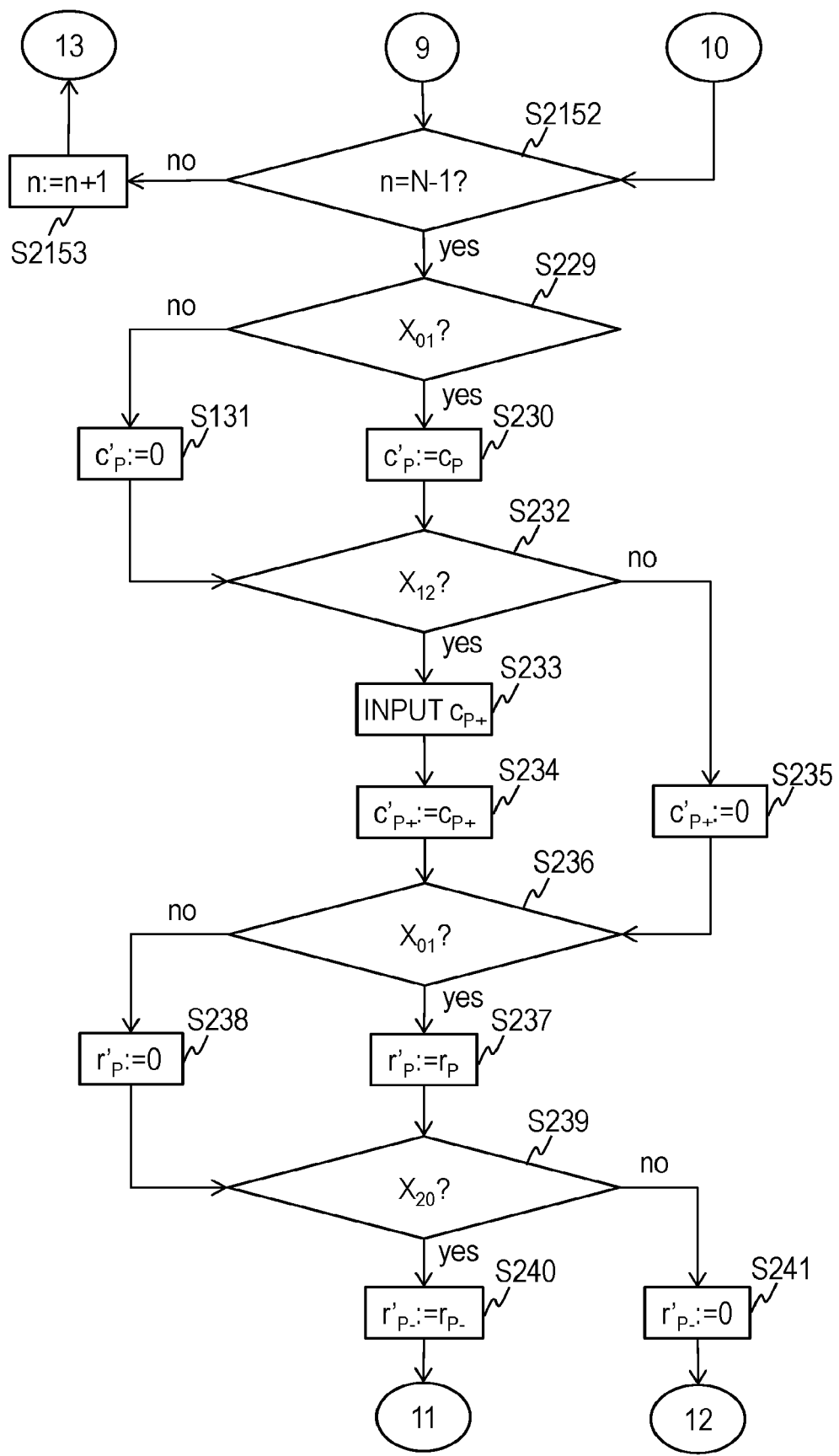
FIG. 11 is the flowchart for illustrating the secret computation method of the embodiment.
Figure 12:
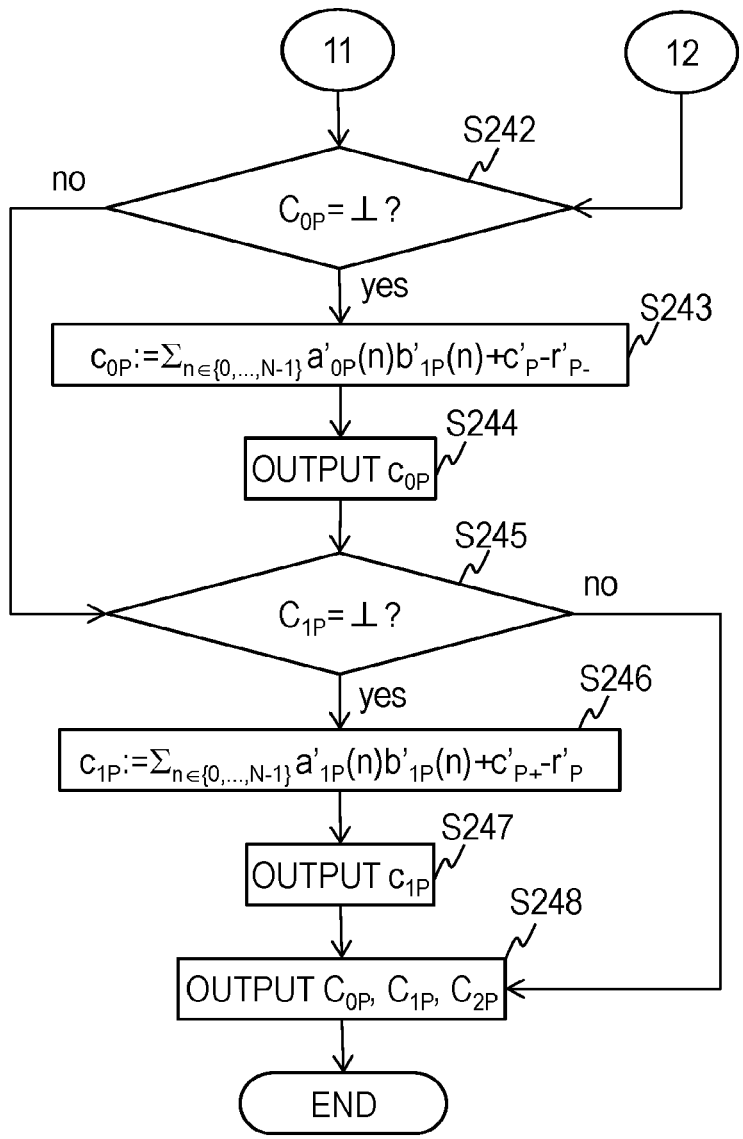
FIG. 12 is the flowchart for illustrating the secret computation method of the embodiment.

In the present embodiment, secret computation of product-sum operation $\Sigma_{n\in\{0,\ldots,N-1\}}a(n)b(n)$ between an input value $\{a(0), \ldots, a(N-1)\}$ and an input value $\{b(0), \ldots, b(N-1)\}$ is performed. Though N≥1 is satisfied, a process is the same as the first embodiment in the case of N=1. It is in the case of N≥2 that the present embodiment is substantially meaningful. Each $a(n)$ ($n=0, \ldots, N-1$) is divided into three subshares $a_1(n)$, $a_2(n)$, $a_3(n)$ satisfying $a(n)=a_1(n)+a_2(n)+a_3(n)$, and each $b(n)$ is divided into three subshares $b_1(n)$, $b_2(n)$, $b_3(n)$ satisfying $b(n)=b_1(n)+b_2(n)+b_3(n)$. That is, $a(n)$ is a function value of the subshares $a_1(n)$, $a_2(n)$, $a_3(n)$, and $b(n)$ is a function value of the subshares $b_1(n)$, $b_2(n)$, $b_3(n)$. To each secret computation apparatus 21-P (P=0, 1, 2), a share $(a_{0P}(n), a_{1P}(n))$ (an assigned share), which is a proper subset of a subshare set $(a_{0P}(n), a_{1P}(n), a_{2P}(n))$ with three subshares $a_{0P}(n)$, $a_{1P}(n)$, $a_{2P}(n)$ as elements, is assigned. Here, $a_{0P}(n)=a_1(n)_{(P-1 \mod 3)}$ and $a_{1P}(n)=a_0(n)_{(p+1 \mod 3)}$ are satisfied. Further, to each secret computation apparatus 21-P (P=0, 1, 2), a share $(b_{0P}(n), b_{1P}(n))$ (an assigned share), which is a proper subset of a subshare set $(b_{0P}(n), b_{1P}(n), b_{2P}(n))$ with three subshares $b_{0P}(n)$, $b_{1P}(n)$, $b_{2P}(n)$ as elements, is assigned. Here, $b_{0P}(n)=b_1(n)_{(P-1 \mod 3)}$ and $b_{1P}(n)=b_0(n)_{(P+1 \mod 3)}$ are satisfied. That is, shares $(a_{00}(n), a_{10}(n))=(a_2(n), a_0(n))$ and $(b_{00}(n), b_{10}(n))=(b_2(n), b_0(n))$ are assigned to the secret computation apparatus 21-0, shares $(a_{01}(n), a_{11}(n))=(a_0(n), a_1(n))$ and $(b_{01}(n), b_{11}(n))=(b_0(n), b_1(n))$ are assigned to the secret computation apparatus 21-1, and shares $(a_{02}(n), a_{12}(n))=(a_1(n), a_2(n))$ and $(b_{02}(n), b_{12}(n))=(b_1(n), b_2(n))$ are assigned to the secret computation apparatus 21-2. For the secret computation apparatus 21-P, shares that are not assigned thereto are "the external assigned shares". In the storage 211-P of each secret computation apparatuses 21-P (FIG. 2), the shares $(a_{0P}(n), a_{1P}(n))$ and $(b_{0P}(n), b_{1P}(n))$ (assigned shares) are stored (FIG. 8). These subshares apparently satisfy relationships of $a(n)=a_{0P}(n)+a_{1P}(n)+a_{2P}(n)$ and $b(n)=b_{0P}(n)+b_{1P}(n)+b_{2P}(n)$.

Meta information A indicating values according to the elements of the subshare set $(a_{0P}(n), a_{1P}(n), a_{2P}(n))$ or indicating that the elements are concealed values, and meta information B indicating values according to the elements of the subshare set $(b_{0P}(n), b_{1P}(n), b_{2P}(n))$ or indicating that the elements are concealed values are set. "The meta information A indicating values according to the elements $a_{jP}(n)$"

may indicate values $A_{JP}(n)$ indicating the elements $a_{JP}(n)$ (J=0, 1, 2) (that is, $A_{JP}(n):=a_{JP}(n)$) or may indicate values $A_{JP}(n)$ that satisfy $a_{JP}(n)=f(A_{JP}(n))$ for a function f that uniquely specifies the elements $a_{JP}(n)$. The function f is, for example, a homomorphism function. In the former case, $A_{JP}(n)$ are elements of a set R with values that the input value a(n) can take as elements. In the latter case, $A_{JP}(n)$ are elements of such a domain R' that a range of a function f belongs to the set R. "The meta information A indicating that the elements $a_{JP}(n)$ are concealed values" indicates the values $A_{JP}(n)=\perp$ indicating that the elements $a_{JP}(n)$ (J=0, 1, 2) are concealed values. In the case of $A_{JP}(n)=\perp$, it is not possible to obtain the values of the elements $a_{JP}(n)$ only from the meta information A. Any information that indicates such values $A_{0P}(n)$, $A_{1P}(n)$, $A_{2P}(n)$ may be made to be the meta information A. For example, a set $(A_{0P}(n), A_{1P}(n), A_{2P}(n))$ (n=0, ... N-1) with values $A_{0P}(n)$, $A_{1P}(n)$, $A_{2P}(n)$ as elements may be made to be the meta information A; one value indicating the set $(A_{0P}(n), A_{1P}(n), A_{2P}(n))$ may be made to be the meta information A; or a set of values each of which indicates a subset with a plurality of elements of the set $(A_{0P}(n), A_{1P}(n), A_{2P}(n))$ may be made to be the meta information A. The above point similarly applies to the meta information B, and any information that indicates values $B_{0P}(n)$, $B_{1P}(n)$, $B_{2P}(n)$ may be made to be the meta information B. Here, $B_{JP}(n):=b_{JP}(n)$ or $b_{JP}(n)=f(B_{JP}(n))$ or $B_{JP}(n):=\perp$ is satisfied. In the present embodiment, if at least one of $A_{0P}(n)$, $A_{1P}(n)$, $A_{2P}(n)$, $B_{0P}(n)$, $B_{1P}(n)$ and $B_{2P}(n)$ is not "$\perp$", the number of times of transferring values among the secret computation apparatuses 21-P can be reduced. The meta information A and B are stored in the storages 211-P of all the secret computation apparatuses 21-P (P=0, 1, 2).

<Secret Computation Process>

Next, content of a process for secret computation of the present embodiment will be described with the use of FIGS. 8 to 12. Each of the secret computation apparatuses 21-P (P=0, 1, 2) executes the following process.

The sharing part 214-P of the secret computation apparatus 21-P performs processing according to whether $x_{01}$ corresponding to the meta information A and B stored in the storage 211-P is true (T) or false (F). Here, $x_{JK}:=[\Sigma_{n\in\{0,\ldots,N-1\}}\{A_{JP}(n)B_{KP}(n)+A_{KP}(n)B_{JP}(n)\}=\perp]\in\{T, F\}((J, K)=(0, 1), (1, 2), (2, 0); n=0, \ldots, N-1)$ is satisfied. Here, $[\Sigma_{n\in\{0,\ldots,N-1\}}\{A_{JP}(n)B_{KP}(n)+A_{KP}(n)B_{JP}(n)\}=\perp]$ indicates a truth value indicating whether a proposition that "$\Sigma_{n\in\{0,\ldots,N-1\}}\{A_{JP}(n)B_{KP}(n)+A_{KP}(n)B_{JP}(n)\}=\perp$ is satisfied" is true (T) or false (F). That "$\Sigma_{n\in\{0,\ldots,N-1\}}\{A_{JP}(n)B_{KP}(n)+A_{KP}(n)B_{JP}(n)\}=\perp$ is satisfied" means that a value according to $\Sigma_{n\in\{0,\ldots,N-1\}}\{a_{JP}(n)b_{KP}(n)+a_{KP}(n)b_{JP}(n)\}$ is not obtained from the meta information A and B (step S201).

If $x_{01}$ is true ($x_{01}=T$) (when a value according to a provided corresponding value $\Sigma_{n\in\{0,\ldots,N-1\}}\{a_{0P}(n)b_{1P}(n)+a_{1P}(n)b_{0P}(n)\}$ is not obtained from the meta information A and B), the sharing part 214-P performs communication for sharing an arbitrary value $r_P$ with an external secret computation apparatus 21-(P+1 mod 3). For example, the sharing part 214-P stores the generated or selected arbitrary value $r_P$ into the storage 211-P and sends it to the communication part 215-P. The communication part 215-P transmits the arbitrary value $r_P$ to the secret computation apparatus 21-(P+1 mod 3). The arbitrary value $r_P$ is inputted to a communication part 215-(P+1 mod 3) of the secret computation apparatus 21-(P+1 mod 3) and stored into a storage 211-(P+1 mod 3) (step S202). After that, the process proceeds to step S203. On the other hand, if $x_{01}$ is false ($x_{01}=F$), the process proceeds to step S203 without executing step S202.

At step S203, the sharing part 214-P performs processing according to whether $x_{20}$ corresponding to the meta information A and B stored in the storage 211-P is true (T) or false (F) (step S203). If $x_{20}$ is true ($x_{20}=T$) (when a value according to $\Sigma_{n\in\{0,\ldots,N-1\}}\{a_{2P}(n)b_{0P}(n)+a_{0P}(n)b_{2P}(n)\}$ is not obtained from the meta information A and B), the sharing part 214-P performs communication for sharing an arbitrary value $r_{P_-}:=r_{(P-1 \ mod \ 3)}$ with an external secret computation apparatus 21-(P-1 mod 3). The arbitrary value $r_{P_-}$ may be a random number, a pseudorandom number or a constant. For example, a sharing part 214-(P-1 mod 3) of the secret computation apparatus 21-(P-1 mod 3) stores the generated or selected arbitrary value $r_{P_-}$ into a storage 211-(P-1 mod 3) and sends it to a communication part 215-(P-1 mod 3). The communication part 215-(P-1 mod 3) transmits the arbitrary value $r_{P_-}$ to the secret computation apparatus 21-P. The arbitrary value $r_{P_-}$ is inputted to the sharing part 214-P, and the sharing part 214-P stores the arbitrary value $r_{P_-}$ into the storage 211-P (step S204). After that, the process proceeds to step S205. On the other hand, if $x_{20}$ is false ($x_{20}=F$), the process proceeds to step S205 without executing step S204.

At step S205, the processing part 2120-P of the operation part 212-P performs processing according to whether $x_{01}$ corresponding to the meta information A and B stored in the storage 211-P is true (T) or false (F) (step S205). If $x_{01}$ is true ($x_{01}=T$) (when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B), the processing part 2120-P reads the shares $(a_{0P}(n), a_{1P}(n))$ and $(b_{0P}(n), b_{1P}(n))$ and the arbitrary value $r_P$ from the storage 211-P; and obtains and outputs a provided value $c_P:=\Sigma_{n\in\{0,\ldots,N-1\}}\{a_{0P}(n)b_{1P}(n)+a_{1P}(n)b_{0P}(n)\}+r_P$ (step S206). The provided value $c_P$ is transmitted from the communication part 215-P to the external secret computation apparatus 21-(P-1 mod 3). The provided value $c_P$ is inputted to the communication part 215-(P-1 mod 3) of the secret computation apparatus 21-(P-1 mod 3) and stored into the storage 211-(P-1 mod 3) (step S207). After that, the process proceeds to step S210. On the other hand, if $x_{01}$ is false ($x_{01}=F$), the process proceeds to step S210 without executing steps S206 and S207.

At step S210, the processing part 2127-P of the operation part 212-P obtains $C_{0P}:=\Sigma_{n\in\{0,\ldots,N-1\}}\{A_{0P}(n)B_{0P}(n)+A_{0P}(n)B_{1P}(n)+A_{1P}(n)B_{0P}(n)\}$ from the meta information A and B stored in the storage 211-P and outputs $C_{0P}$ (step S210). Here, if a value according to $\Sigma_{n\in\{0,\ldots,N-1\}}\{a_{0P}(n)b_{0P}(n)+a_{0P}(n)b_{1P}(n)+a_{1P}(n)b_{0P}(n)\}$ is not obtained from the meta information A and B (in the case of $\Sigma_{n\in\{0,\ldots,N-1\}}\{A_{0P}(n)B_{0P}(n)+A_{0P}(n)B_{1P}(n)+A_{1P}(n)B_{0P}(n)\}=\perp$), $C_{0P}:=\perp$ is satisfied. On the other hand, if the value according to $\Sigma_{n\in\{0,\ldots,N-1\}}\{a_{0P}(n)b_{0P}(n)+a_{0P}(n)b_{1P}(n)+a_{1P}(n)b_{0P}(n)\}$ is obtained from the meta information A and B, $C_{0P}$ is the value according to $\Sigma_{n\in\{0,\ldots,N-1\}}\{a_{0P}(n)b_{0P}(n)+a_{0P}(n)b_{1P}(n)+a_{1P}(n)b_{0P}(n)\}$.

Next, the processing part 2128-P of the operation part 212-P obtains $C_{1P}:=\Sigma_{n\in\{0,\ldots,N-1\}}\{A_{1P}(n)B_{1P}(n)+A_{1P}(n)B_{2P}(n)+A_{2P}(n)B_{1P}(n)\}$ from the meta information A and B stored in the storage 211-P and outputs $C_{1P}$ (step S213). Here, if a value according to $\Sigma_{n\in\{0,\ldots,N-1\}}\{a_{1P}(n)b_{1P}(n)+a_{1P}(n)b_{2P}(n)+a_{2P}(n)b_{1P}(n)\}$ is not obtained from the meta information A and B $\Sigma_{n\in\{0,\ldots,N-1\}}\{A_{1P}(n)B_{1P}(n)+A_{1P}(n)B_{2P}(n)+A_{2P}(n)B_{1P}(n)\}=..)$, $C_{1P}:=\perp$ is satisfied. On the other hand, if the value according to $\Sigma_{n\in\{0,\ldots,N-1\}}\{a_{1P}(n)b_{1P}(n)+a_{1P}(n)b_{2P}(n)+a_{2P}(n)b_{1P}(n)\}$ is obtained from the meta information A and B, $C_{1P}$ is the value according to $\Sigma_{n\in\{0,\ldots,N-1\}}\{a_{1P}(n)b_{1P}(n)+a_{1P}(n)b_{2P}(n)+a_{2P}(n)b_{1P}(n)\}$.

Next, the processing part 2128-P of the operation part 212-P obtains $C_{2P}:=\Sigma_{n\in\{0,\ldots,N-1\}}\{A_{2P}(n)B_{2P}(n)+A_{2P}(n)b_{0P}(n)+A_{0P}(n)B_{2P}(n)\}$ from the meta information A and B stored in the storage 211-P and outputs $C_{2P}$ (step S216). Here, if a value according to $\Sigma_{n\in\{0,\ldots,N-1\}}\{a_{2P}(n)b_{2P}(n)+a_{2P}(n)b_{0P}(n)+a_{0P}(n)b_{2P}(n)\}$ is not obtained from the meta information A and B $\Sigma_{n\in\{0,\ldots,N-1\}}\{A_{2P}(n)B_{2P}(n)+A_{2P}(n)B_{0P}(n)+A_{0P}(n)B_{2P}(n)\}=\perp)$, $C_{2P}:=\perp$ is satisfied. On the other hand, if the value according to $\Sigma_{n\in\{0,\ldots,N-1\}}\{a_{2P}(n)b_{2P}(n)+a_{2P}(n)b_{0P}(n)+a_{0P}(n)b_{2P}(n)\}$ is obtained from the meta information A and B, $C_{2P}$ is the value according to $\Sigma_{n\in\{0,\ldots,N-1\}}\{a_{2P}(n)b_{2P}(n)+a_{2P}(n)b_{0P}(n)+a_{0P}(n)b_{2P}(n)\}$.

The controller 213-P performs initialization so that n:=0 is obtained (step S2151). Next, the processing part 212A-P of the operation part 212-P performs processing according to whether $A_{0P}(n)$ corresponding to the meta information A stored in the storage 211-P is true (T) or false (F) (step S217). The processing part 212A-P sets $a'_{0P}(n):=a_{0P}(n)$ (step S218) if $A_{0P}(n)$ is true ($A_{0P}(n)$=T), and sets $a'_{0P}(n):=A_{0P}(n)$ (step S219) if $A_{0P}(n)$ is false ($A_{0P}(n)$=F). That is, if the meta information A indicates a value according to $a_{0P}(n)$, $a'_{0P}(n)$ is the values indicated by the meta information A.

Further, the processing part 212A-P performs processing according to whether $A_{1P}(n)$ corresponding to the meta information A stored in the storage 211-P is true (T) or false (F) (step S220). The processing part 212A-P sets $a'_{1P}(n):=a_{1P}(n)$ (step S221) if $A_{1P}(n)$ is true ($A_{1P}(n)$=T); and sets $a'_{1P}(n):=A_{1P}(n)$ and outputs $a'_{1P}(n)$ (step S222) if $A_{1P}(n)$ is false ($A_{1P}(n)$=F). That is, if the meta information A indicates a value according to $a_{1P}(n)$, $a'_{1P}(n)$ is the values indicated by the meta information A.

Further, the processing part 212A-P performs processing according to whether $B_{0P}(n)$ corresponding to the meta information B stored in the storage 211-P is true (T) or false (F) (step S223). The processing part 212A-P sets $b'_{0P}(n):=b_{0P}(n)$ (step S224) if $B_{0P}(n)$ is true ($B_{0P}(n)$=T); and sets $b'_{0P}(n):=B_{0P}(n)$ and outputs $b'_{0P}(n)$ (step S225) if $B_{0P}(n)$ is false ($B_{0P}(n)$=F). That is, if the meta information B indicates a value according to $b_0(n)$, $b'_{0P}(n)$ is the values indicated by the meta information B.

Next, the processing part 212A-P performs processing according to whether $B_{1P}(n)$ corresponding to the meta information B stored in the storage 211-P is true (T) or false (F) (step S226). The processing part 212A-P sets $b'_{1P}(n):=b_{1P}(n)$ (step S227) if $B_{1P}(n)$ is true ($B_{1P}(n)$=T); and sets $b'_{1P}(n):=B_{1P}(n)$ and outputs $b'_{1P}(n)$ (step S228) if $B_{1P}(n)$ is false ($B_{1P}(n)$=F). That is, if the meta information B indicates a value according to $b_{1P}(n)$, $b'_{1P}(n)$ is the values indicated by the meta information B.

The controller 213-P judges whether n=N-1 is satisfied (step S2152). Here, if n=N-1 is not satisfied, the controller 213-P sets n:=n+1 (step S2153) and returns to step S217. If n=N-1 is satisfied, the processing part 2121-P of the operation part 212-P performs processing according to whether $x_{10}$ corresponding to the meta information A and B stored in the storage 211-P is true (T) or false (F) (step S229). If $x_{10}$ is true ($x_{10}$=T) (when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B), the processing part 2121-P sets $c'_P:=c_P$ (step S230). Otherwise (when $c'_P:=c_P$ is not set), the processing part 2121-P sets $c'_P:=0$ (step S231) and outputs $c'_P$.

The processing part 2122-P of the operation part 212-P performs processing according to whether $x_{12}$ corresponding to the meta information A and B stored in the storage 211-P is true (T) or false (F) (step S232). If $x_{12}$ is true (T) (when a value according to an acquired corresponding value $\Sigma_{n\in\{0,\ldots,N-1\}}\{a_{1P}(n)b_{2P}(n)+a_{2P}(n)b_{1P}(n)\}$ is not obtained from the meta information A and B), the acquired value $c_{P+}:=c_{(P+1 \bmod 3)}$ have been transmitted from the secret computation apparatus 21-(P+1 mod 3) at step S207 described before. The acquired value $c_{P+}$ is inputted to the processing part 2122-P (step S233). The processing part 2122-P sets and outputs $c'_{P+}:=c_{P+}$ (step S234). On the other hand, if $x_{12}$ is false (F) (when $c'_{P+}:=c_{P+}$ is not set), the processing part 2122-P sets and outputs $c'_{P+}:=0$ (step S235).

The processing part 2123-P of the operation part 212-P performs processing according to whether $x_{01}$ corresponding to the meta information A and B stored in the storage 211-P is true (T) or false (F) (step S236). If $x_{01}$ is true (T) (when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B), the processing part 2122-P sets $r'_P:=r_P$ (step S237). Otherwise (when $r'_P:=r_P$ is not set), the processing part 2122-P sets $r'_P:=0$ (step S238) and outputs $r'_P$.

The processing part 2124-P of the operation part 212-P performs processing according to whether $x_{20}$ corresponding to the meta information A and B stored in the storage 211-P is true (T) or false (F) (step S239). If $x_{20}$ is true (T) (when the value according to $\Sigma_{n\in\{0,\ldots,N-1\}}\{a_{2P}(n)b_{0P}(n)+a_{0P}(n)b_{2P}(n)\}$ is not obtained from the meta information A and B), the processing part 2124-P sets $r'_{P-}:=r_{P-}$ (step S240). Otherwise (when $r'_{P-}:=r_{P-}$ is not set), the processing part 2124-P sets $r'_{P-}:=0$ (step S241) and outputs $r'_{P-}$.

The processing part 2125-P of the operation part 212-P performs processing according to whether $C_{0P}=\perp$ is satisfied or not (step S242). If $C_{0P}=\perp$ is satisfied, the processing part 2125-P obtains $c_{0P}:=\Sigma_{n\in\{0,\ldots,N-1\}}a'_{0P}(n)b'_{1P}(n)+c'_P-r'_{P-}$ (step S243); the operation part 212-P outputs $c_{0P}$ (step S244); and the process proceeds to step S245. $C_{0P}=\perp$ is satisfied when the value according to $\Sigma_{n\in\{0,\ldots,N-1\}}\{a_{2P}(n)b_{0P}(n)+a_{0P}(n)b_{2P}(n)\}$ is not obtained from the meta information A and B and/or, $C_{0P}=\perp$ is satisfied when the value according to $\Sigma_{n\in\{0,\ldots,N-1\}}\{a_{0P}(n)b_{0P}(n)+a_{0P}(n)b_{1P}(n)+a_{1P}(n)b_{0P}(n)\}$ is not obtained from the meta information A and B. On the other hand, if $C_{0P}=\perp$ is not satisfied, the process proceeds to step S245 without executing steps S243 and S244.

At step S245, the processing part 2126-P of the operation part 212-P performs processing according to whether $C_{1P}=\perp$ is satisfied or not (S245). If $C_{1P}=\perp$ is satisfied, the processing part 2126-P obtains $c_{1P}:=\Sigma_{n\in\{0,\ldots,N-1\}}a'_{1P}(n)b'_{1P}(n)+c'_{P+}-r'_P$ (step S246), and the operation part 212-P outputs $c_{1P}$ (step S247). On the other hand, if $C_{1P}=\perp$ is not satisfied, the process proceeds to step S248 without executing steps S246 and S247.

At step 248, the operation part 212-P outputs $C_{0P}$, $C_{1P}$, $C_{2P}$. Here, $C_{0P}$, $C_{1P}$, $C_{2P}$ are meta information about secret share values of an operation result $\Sigma_{n\in\{0,\ldots,N-1\}}a(n)b(n)$. Here, $c_{0P}$ and $c_{1P}$ are secret share values of the operation result $\Sigma_{n\in\{0,\ldots,N-1\}}a(n)b(n)$. Here, $c_{0P}$ is required to be outputted only in the case of $C_{0P}:=\perp$, and $c_{1P}$ is required to be outputted only in the case of $C_{1P}:=\perp$.

<Features of the Present Embodiment>

In the present embodiment, it is possible to reduce the number of times of transmission/reception of values among the secret computation apparatuses 21-P according to values indicated by meta information A and B. Further, in the case where operation of a value that is not required to be transmitted or received any more can be omitted, the amount of operation can be also reduced. Furthermore, in the case where the amount of operation using the meta information is smaller than the amount of operation using shares also, it is possible to reduce the amount of operation.

[Modifications and the Like]

The present invention is not limited to the above embodiments. For example, in the embodiments described above, the case of performing multiplication or product-sum operation by secret computation is illustrated. However, the present invention may be applied to any scheme if the scheme is such that values are transferred among a plurality of secret computation apparatuses, and each secret computation apparatus performs secret computation using values received from the other secret computation apparatuses. Further, each operation described above may be operation on a finite field, operation on an extension field, operation on a ring, or operation on other algebraic systems.

The various processes described above are not only executed in time-series order according to the description but also may be executed in parallel or individually according to the processing capacity of an apparatus that executes the processes or as necessary. Further, instead of secret computation apparatuses transferring values via a network, transfer of values may be performed via a portable storage medium. In addition, it goes without saying that appropriate modification is possible within a range not departing from the spirit of the present invention.

In the case of realizing the configuration described above by a computer, processing content of functions each apparatus should have is written by a program By executing the program on the computer, the above processing functions are realized on the computer. The program in which the processing content is written can be recorded in a computer-readable recording medium. An example of the computer-readable recording medium is a non-transitory recording medium. Examples of such a recording medium are a magnetic recording device, an optical disk, a magneto-optical recording medium, a semiconductor memory and the like.

Distribution of the program is performed, for example, by sale, transfer, lending and the like of a portable recording program such as a DVD and a CD-ROM in which the program is recorded. Furthermore, a configuration is also possible in which the program is stored in a storage device of a server computer, and the program is distributed by transferring the program from the server computer to other computers via a network.

For example, a computer that executes such a program first stores the program recorded in a portable recording medium or the program transferred from a server computer into its storage device once. At the time of executing a process, the computer reads the program stored in its storage device and executes the process in accordance with the read program. As another execution form of the program, the computer may read the program directly from the portable recording medium and executes the process in accordance with the program. Furthermore, it is also possible to, each time a program is transferred from the server computer to the computer, execute a process in accordance with the received program A configuration is also possible in which, without transferring the program from the server computer to the computer, the process described above is executed by a so-called ASP (Application Service Provider) type service in which processing functions are realized only by an instruction to execute the program and acquisition of a result.

In the above embodiments, the processing functions of the present apparatus are realized by executing a predetermined program on a computer. However, at least a part of the processing functions may be realized by hardware.

DESCRIPTION OF REFERENCE NUMERALS 11-0 to 11-2, 21-0 to 21-2 secret computation apparatus
1, 2 secret computation system

What is claimed is:

1. A secret computation apparatus that obtains a secret share value of an operation result according to an input value, wherein
the input value is a function value of a plurality of subshares; and
the secret computation apparatus comprises:
a storage that stores an assigned share which is a proper subset of a sub share set with the plurality of subshares as elements, and meta information indicating values according to the elements of the subshare set or indicating that the elements are concealed values; and
processing circuitry configured to implement:
an output part that, when a value according to a provided corresponding value according to a subset of the assigned share is not obtained from the meta information, transmits a provided value according to the provided corresponding value obtained from the subset of the assigned share;
an input part to which, when a value according to an acquired corresponding value according to a subset of an external assigned share, which is a proper subset of the subshare set, is not obtained from the meta information, an acquired value according to the acquired corresponding value is inputted; and
an operation part that, when the acquired value is inputted to the input part, obtains the secret share value at least using the acquired value, wherein
the operation result is a multiplication result between the input value a and a second input value b;
the input value a satisfies $a=a_{0P}+a_{1P}+a_{2P}$ for the subshares $a_{0P}, a_{1P}, a_{2P}$;
the second input value b satisfies $b=b_{0P}+b_{1P}+b_{2P}$ for second subshares $b_{0P}, b_{1P}, b_{2P}$;
$a'_{0P}, b'_{0P}$ and $b'_{1P}$ are values according to $a_{0P}, a_{1P}, b_{0P}$ and $b_{1P}$, respectively;
the storage stores the assigned share $(a_{0P}, a_{1P})$ which is a proper subset of the subshare set $(a_{0P}, a_{1P}, a_{2P})$, the meta information A indicating values according to the elements of the subshare set $(a_{0P}, a_{1P}, a_{2P})$ or indicating that the elements are concealed values, a second assigned share $(b_{0P}, b_{1P})$ which is a proper subset of a second subshare set $(b_{0P}, b_{1P}, b_{2P})$, and second meta information B indicating values according to elements of the second subshare set $(b_{0P}, b_{1P}, b_{2P})$ or indicating that the elements are concealed values;
the secret computation apparatus comprises processing circuitry configured to implement:
a first sharing part that, when the value according to the provided corresponding value $a_{0P}b_{1P}+a_{1P}b_{0P}$ is not obtained from the meta information A and B, performs communication for sharing a first arbitrary value $r_P$ with an external first secret computation apparatus; and
a second sharing part that, when a value according to $a_{2P}b_{0P}+a_{0P}b_{2P}$ is not obtained from the meta information A and B, performs communication for sharing a second arbitrary value $r_P$ with an external second secret computation apparatus;
when the value according to the provided corresponding value $a_{0P}b_{1P}+a_{1P}b_{0P}$ is not obtained from the meta information A and B, the output part transmits the provided value $c_P:=a_{0P}b_{1P}+a_{1P}b_{0P}+r_P$ to the second secret computation apparatus;

when the value according to the acquired corresponding value $a_{1P}b_{2P}+a_{2P}b_{1P}$ is not obtained from the meta information A and B, the input part receives the acquired value $c_{P+}$ transmitted from the first secret computation apparatus; and the operation part comprises:

a first processing part that sets $c'_P:=c_P$ when the value according to the provided corresponding value $a_{0P}b_{1P}+a_{1P}b_{0P}$ is not obtained from the meta information A and B, and sets $c'_P:=0$ when $c'_P:=c_P$ is not set;

a second processing part that sets $c'_{P+}:=c_{P+}$ when the value according to the acquired corresponding value $a_{1P}b_{2P}+a_{2P}b_{1P}$ is not obtained from the meta information A and B, and sets $c'_{P+}:=0$ when $c'_{P+}:=c_{P+}$ is not set;

a third processing part that sets $r'_P:=r_P$ when the value according to the provided corresponding value $a_{0P}b_{1P}+a_{1P}b_{0P}$ is not obtained from the meta information A and B, and sets $r'_P:=0$ when $r'_P:=r_P$ is not set;

a fourth processing part that sets $r'_{P-}:=r_{P-}$ when the value according to $a_{2P}b_{0P}+a_{0P}b_{2P}$ is not obtained from the meta information A and B, and sets $e_{P-}:=0$ when $r'_{P-}:=r_{P-}$ is not set;

a fifth processing part that obtains $c_{0P}:=a'_{0P}b'_{1P}+c'_P-r'_{P-}$ when the value according to $a_{2P}b_{0P}+a_{0P}b_{2P}$ is not obtained from the meta information A and B and/or obtains $c_{0P}:=a'_{0P}b'_{1P}+c'_P-r'_{P-}$ when a value according to $a_{0P}b_{0P}+a_{0P}b_{1P}+a_{1P}b_{0P}$ is not obtained from the meta information A and B; and a sixth processing part that obtains $c_{1P}:=a'_{1P}b'_{1P}+c'_{P+}-r'_P$ when the value according to $a_{0P}b_{1P}+a_{1P}b_{0P}$ is not obtained from the meta information A and B and/or obtains $c_{1P}:=a'_{1P}b'_{1P}+c'_++-r'_P$ when a value according to $a_{1P}b_{1P}+a_{1P}b_{2P}+a_{2P}b_{1P}$ is not obtained from the meta information A and B.

2. The secret computation apparatus according to claim 1, wherein the operation part comprises:

a seventh processing part that, when the value according to $a_{0P}b_{0P}+a_{0P}b_{1P}+a_{1P}b_{0P}$ is not obtained from the meta information A and B, sets $C_{0P}:=\perp$ and, when the value according to $a_{0P}b_{0P}+a_{0P}b_{1P}+a_{1P}b_{0P}$ is obtained from the meta information A and B, obtains the value according to $a_{0P}b_{0P}+a_{0P}b_{1P}+a_{1P}b_{0P}$ from the meta information A and B and sets the value as $C_{0P}$;

an eighth processing part that, when the value according to $a_{1P}b_{1P}+a_{1P}b_{2P}+a_{2P}b_{1P}$ is not obtained from the meta information A and B, sets $C_{1P}:=\perp$ and, when the value according to $a_{1P}b_{1P}+a_{1P}b_{2P}+a_{2P}b_{1P}$ is obtained from the meta information A and B, obtains the value according to $a_{1P}b_{1P}+a_{1P}b_{2P}+a_{2P}b_{1P}$ from the meta information A and B and sets the value as $C_{1P}$; and a ninth processing part that, when a value according to $a_{2P}b_{2P}+a_{2P}b_{0P}+a_{0P}b_{2P}$ is not obtained from the meta information A and B, sets $C_{2P}:=\perp$ and, when the value according to $a_{2P}b_{2P}+a_{2P}b_{0P}+a_{0P}b_{2P}$ is obtained from the meta information A and B, obtains the value according to $a_{2P}b_{2P}+a_{2P}b_{0P}+a_{0P}b_{2P}$ from the meta information A and B and sets the value as $C_{2P}$; and $C_{0P}$, $C_{1P}$, $C_{2P}$ are meta information about the secret share value; the secret share value includes $c_{0P}$ in the case of $C_{0P}:=\perp$; and the secret share value includes $c_{1P}$ in the case of $C_{1P}:=\perp$.

3. A secret computation apparatus that obtains a secret share value of an operation result according to an input value, wherein the input value is a function value of a plurality of subshares; and the secret computation apparatus comprises:

a storage that stores an assigned share which is a proper subset of a sub share set with the plurality of subshares as elements, and meta information indicating values according to the elements of the subshare set or indicating that the elements are concealed values; and processing circuitry configured to implement:

an output part that, when a value according to a provided corresponding value according to a subset of the assigned share is not obtained from the meta information, transmits a provided value according to the provided corresponding value obtained from the subset of the assigned share;

an input part to which, when a value according to an acquired corresponding value according to a subset of an external assigned share, which is a proper subset of the subshare set, is not obtained from the meta information, an acquired value according to the acquired corresponding value is inputted; and an operation part that, when the acquired value is inputted to the input part, obtains the secret share value at least using the acquired value, wherein the operation result is an operation result $\Sigma_{n\in\{0,\ldots,N-1\}}a(n)b(n)$ between the input value $\{a(0),\ldots,a(N-1)\}$ and a second input value $\{b(0),\ldots,b(N-1)\}$, and $N\geq 1$ and $n=0,\ldots,N-1$ are satisfied;

$a(n)$ satisfies $a(n)=a_{0P}(n)+a_{1P}(n)+a_{2P}(n)$ for the subshares $a_{0P}(n)$, $a_{1P}(n)$, $a_{2P}(n)$;

$b(n)$ satisfies $b(n)=b_{0P}(n)+b_{1P}(n)+b_{2P}(n)$ for second subshares $b_{0P}(n)$, $b_{1P}(n)$, $b_{2P}(n)$;

$a'_{0P}(n)$, $a'_{1P}(n)$, $b'_{0P}(n)$ and $b'_{1P}(n)$ are values according to $a_{0P}(n)$, $a_{1P}(n)$, $b_{0P}(n)$ and $b_{1P}(n)$, respectively;

the storage stores the assigned share $(a_{0P}(n), a_{1P}(n))$ which is a proper subset of the subshare set $(a_{0P}(n), a_{1P}(n), a_{2P}(n))$, the meta information. A indicating values according to elements of the subshare set $(a_{0P}(n), a_{1P}(n), a_{2P}(n))$ or indicating that the elements are concealed values, a second assigned share $(b_{0P}, b_{1P})$ which is a proper subset of a second subshare set $(b_{0P}(n), b_{1P}(n), b_{2P}(n))$, and second meta information B indicating values according to elements of the second subshare set $(b_{0P}(n), b_{1P}(n), b_{2P}(n))$ or indicating that the elements are concealed values;

the secret computation apparatus comprises processing circuitry configured to implement:

a first sharing part that, when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B, performs communication for sharing a first arbitrary value $r_P$ with an external first secret computation apparatus; and a second sharing part that, when the value according to $\Sigma_{n\in\{0,\ldots,N-1\}}\{a_{2P}(n)b_{0P}(n)+a_{0P}(n)b_{2P}(n)\}$ is not obtained from the meta information A and B, performs communication for sharing a second arbitrary value $r_{P-}$ with an external second secret computation apparatus;

when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B, the output part transmit the provided value $c_P:=\Sigma_{n\in\{0,\ldots,N-1\}}\{a_{0P}(n)b_{1P}(n)+a_{1P}(n)b_{0P}(n)\}+r_P$ to the second secret computation apparatus;

when the value according to the acquired corresponding value $\Sigma_{n\in\{0,\ldots,N-1\}}\{a_{1P}(n)b_{2P}(n)+a_{2P}(n)b_{1P}(n)\}$ is not obtained from the meta information A and B, the input part receives the acquired value $c_{P+}$ transmitted from the first secret computation apparatus; and the operation part comprises:

a first processing part that sets $c'_P := c_P$ when the value according to the provided corresponding value $\Sigma_{n \in \{0, \ldots, N-1\}} \{a_{0P}(n)b_{1P}(n) + a_{1P}(n)b_{0P}(n)\}$ is not obtained from the meta information A and B, and sets $c'_P := 0$ when $c'_P := c_P$ is not set;

a second processing part that sets $c'_{P+} := c_{P+}$ when the value according to the acquired corresponding value $\Sigma_{n \in \{0, \ldots, N-1\}} \{a_{1P}(n)b_{2P}(n) + a_{2P}(n)b_{1P}(n)\}$ is not obtained from the meta information A and B, and sets $c'_{P+} := 0$ when $c'_{P+} := c_{P+}$ is not set;

a third processing part that sets $r'_P := r_P$ when the value according to the provided corresponding value $\Sigma_{n \in \{0, \ldots, N-1\}} \{a_{0P}(n)b_{1P}(n) + a_{1P}(n)b_{0P}(n)\}$ is not obtained from the meta information A and B, and sets $r'_P := 0$ when $r'_P := r_P$ is not set;

a fourth processing part that sets $r'_{P-} := r_{P-}$ when the value according to $\Sigma_{n \in \{0, \ldots, N-1\}} \{a_{2P}(n)b_{0P}(n) + a_{0P}(n)b_{2P}(n)\}$ is not obtained from the meta information A and B, and sets $r'_{P-} := 0$ when $r'_{P-} := r_{P-}$ is not set;

a fifth processing part that obtains $c_{0P} := \Sigma_{n \in \{0, \ldots, N-1\}} a'_{0P}(n)b'_{1P}(n) + c'_P - r'_{P-}$ when the value according to $\Sigma_{n \in \{0, \ldots, N-1\}} \{a_{2P}(n)b_{0P}(n) + a_{0P}(n)b_{2P}(n)\}$ is not obtained from the meta information A and B and/or obtains $C_{0P} := \Sigma_{n \in \{0, \ldots, N-1\}} a'_{0P}(n)b'_{1P}(n) + c'_P - r'_{P-}$ when a value according to $\Sigma_{n \in \{0, \ldots, N-1\}} \{a_{0P}(n)b_{0P}(n) + a_{0P}(n)b_{1P}(n) + a_{1P}(n)b_{0P}(n)\}$ is not obtained from the meta information A and B; and a sixth processing part that obtains $c_{1P} := \Sigma_{n \in \{0, \ldots, N-1\}} a'_{1P}(n)b'_{1P}(n) + c'_{P+} - r'_P$ when the value according to $\Sigma_{n \in \{0, \ldots, N-1\}} \{a_{0P}(n)b_{1P}(n) + a_{1P}(n)b_{0P}(n)\}$ is not obtained from the meta information A and B and/or obtains $c_{1P} := \Sigma_{n \in \{0, \ldots, N-1\}} a'_{1P}(n)b'_{1P}(n) + c'_{P-} - r'_P$ when a value according to $\Sigma_{n \in \{0, \ldots, N-1\}} \{a_{1P}(n)b_{1P}(n) + a_{1P}(n)b_{2P}(n) + a_{2P}(n)b_{1P}(n)\}$ is not obtained from the meta information A and B.

4. The secret computation apparatus according to claim 3, wherein the operation part comprises:

a seventh processing part that sets $C_{0P} := \perp$ when the value according to $\Sigma_{n \in \{0, \ldots, N-1\}} \{a_{0P}(n)b_{0P}(n) + a_{0P}(n)b_{1P}(n) + a_{1P}(n)b_{0P}(n)\}$ is not obtained from the meta information A and B, and, when the value according to $\Sigma_{n \in \{0, \ldots, N-1\}} \{a_{0P}(n)b_{0P}(n) + a_{0P}(n)b_{1P}(n) + a_{1P}(n)b_{0P}(n)\}$ is obtained from the meta information A and B, obtains the value according to $\Sigma_{n \in \{0, \ldots, N-1\}} \{a_{0P}(n)b_{0P}(n) + a_{0P}(n)b_{1P}(n) + a_{1P}(n)b_{0P}(n)\}$ from the meta information A and B and sets the value as $C_{0P}$;

an eighth processing part that sets $C_{1P} := \perp$ when the value according to $\Sigma_{n \in \{0, \ldots, N-1\}} \{a_{1P}(n)b_{1P}(n) + a_{1P}(n)b_{2P}(n) + a_{2P}(n)b_{1P}(n)\}$ is not obtained from the meta information A and B, and, when the value according to $\Sigma_{n \in \{0, \ldots, N-1\}} \{a_{1P}(n)b_{1P}(n) + a_{1P}(n)b_{2P}(n) + a_{2P}(n)b_{1P}(n)\}$ is obtained from the meta information A and B, obtains the value according to $\Sigma_{n \in \{0, \ldots, N-1\}} \{a_{1P}(n)b_{1P}(n) + a_{1P}(n)b_{2P}(n) + a_{2P}(n)b_{1P}(n)\}$ from the meta information A and B and sets the value as $C_{1P}$;

a ninth processing part that sets $C_{2P} := \perp$ when a value according to $\Sigma_{n \in \{0, \ldots, N-1\}} \{a_{2P}(n)b_{2P}(n) + a_{2P}(n)b_{0P}(n) + a_{0P}(n)b_{2P}(n)\}$ is not obtained from the meta information A and B, and, when the value according to $\Sigma_{n \in \{0, \ldots, N-1\}} \{a_{2P}(n)b_{2P}(n) + a_{2P}(n)b_{0P}(n) + a_{0P}(n)b_{2P}(n)\}$ is obtained, obtains the value according to $\Sigma_{n \in \{0, \ldots, N-1\}} \{a_{2P}(n)b_{2P}(n) + a_{2P}(n)b_{0P}(n) + a_{0P}(n)b_{2P}(n)\}$ from the meta information A and B and sets the value as $C_{2P}$; and $C_{0P}, C_{1P}, C_{2P}$ are meta information about the secret share value; the secret share value includes $c_{0P}$ in the case of $C_{0P} := \perp$; and the secret share value includes $c_{1P}$ in the case of $C_{1P} := \perp$.

5. The secret computation apparatus according to any one of claims 1 to and 2, wherein the operation result is a value according to the input value and a second input value;

the second input value is a function value of a plurality of second subshares;

the storage stores a second assigned share which is a proper subset of a second subshare set with the plurality of second subshares as elements, and second meta information indicating values according to the elements of the second subshare set or indicating that the elements are concealed values;

when the value according to the provided corresponding value according to the subset of the assigned share and a subset of the second assigned share is not obtained from the meta information and the second meta information, the output part transmits the provided value according to the provided corresponding value obtained from the subset of the assigned share and the subset of the second assigned share; and when the value according to the acquired corresponding value according to the subset of the external assigned share, which is a proper subset of the subshare set, and a subset of a second external assigned share, which is a proper subset of the second subshare set, is not obtained, from the meta information and the second meta information, the acquired value according to the acquired corresponding value is inputted to the input part.

6. A secret computation apparatus that obtains a secret share value of an operation result according to an input value, wherein the input value is a function value of a plurality of subshares; and the secret computation apparatus comprises:

a storage that stores an assigned share which is a proper subset of a subshare set with the plurality of subshares as elements, and meta information indicating values according to the elements of the subshare set or indicating that the elements are concealed values; and processing circuitry configured to implement:

an output part that, when a value according to a provided corresponding value according to a subset of the assigned share is not obtained from the meta information, transmits a provided value according to the provided corresponding value obtained from the subset of the assigned share;

an input part to which, when a value according to an acquired corresponding value according to a subset of an external assigned share, which is a proper subset of the subshare set, is not obtained from the meta information, an acquired value according to the acquired corresponding value is inputted; and an operation part that, when the acquired value is inputted to the input part, obtains the secret share value at least using the acquired value, wherein the operation result is a value according to the input value and a second input value;

the second input value is a function value of a plurality of second subshares;

the storage stores a second assigned share which is a proper subset of a second subshare set with the plurality of second subshares as elements, and second meta information indicating values according to the elements of the second subshare set or indicating that the elements are concealed values;

when the value according to the provided corresponding value according to the subset of the assigned share and a subset of the second assigned share is not obtained from the meta information and the second meta information, the output part outputs the provided value according to the provided corresponding value obtained from the subset of the assigned share and the subset of the second assigned share; and when the value according to the acquired corresponding value according to the subset of the external assigned share, which is a proper subset of the subshare set, and a subset of a second external assigned share, which is a proper subset of the second subshare set, is not obtained, from the meta information and the second meta information, the acquired value according to the acquired corresponding value is inputted to the input part, wherein the operation result is a multiplication result between the input value a and a second input value b;

the input value a satisfies $a=a_{0P}+a_{1P}+a_{2P}$ for the subshares $a_{0P}$, $a_{1P}$, $a_{2P}$;

the second input value b satisfies $b=b_{0P}+b_{1P}+b_{2P}$ for the second subshares $b_{0P}$, $b_{1P}$, $b_{2P}$;

$a'_{0P}$, $a'_{1P}$, $b'_0$ and $b'_{1P}$ are values according to $a_{0P}$, $a_{1P}$, $b_{0P}$ and $b_{1P}$, respectively;

the storage stores the assigned share ($a_{0P}$, $a_{1P}$) which is a proper subset of the subshare set ($a_{0P}$, $a_{1P}$, $a_{2P}$), the meta information A indicating values according to elements of the subshare set ($a_{0P}$, $a_{1P}$, $a_{2P}$) or indicating that the elements are concealed values, the second assigned share ($b_{0P}$, $b_{1P}$) which is a proper subset of the second subshare set ($b_{0P}$, $b_{1P}$, $b_{2P}$), and the second meta information B indicating values according to elements of the second subshare set ($b_{0P}$, $b_{1P}$, $b_{2P}$) or indicating that the elements are concealed values;

the secret computation apparatus comprises processing circuitry configured to implement:

a first sharing part that, when the value according to the provided corresponding value $a_{0P}b_{1P}+a_{1P}b_{0P}$ is not obtained from the meta information A and B, performs communication for sharing a first arbitrary value $r_P$ with an external first secret computation apparatus; and a second sharing part that, when a value according to $a_{2P}b_{0P}+a_{0P}b_{2P}$ is not obtained from the meta information A and B, performs communication for sharing a second arbitrary value $r_{P-}$ with an external second secret computation apparatus;

when the value according to the provided corresponding value $a_{0P}b_{1P}+a_{1P}b_{0P}$ is not obtained from the meta information A and B, the output part transmits the provided value $c_P:=a_{0P}b_{1P}+a_{1P}b_{0P}+r_P$ to the second secret computation apparatus;

when the value according to the acquired corresponding value $a_{1P}b_{2P}+a_{2P}b_{1P}$ is not obtained from the meta information A and B, the input part receives the acquired value $c_{P+}$ transmitted from the first secret computation apparatus; and the operation part comprises:

a first processing part that sets $c'_P:=c_P$ when the value according to the provided corresponding value $a_{0P}b_{1P}+a_{1P}b_{0P}$ is not obtained from the meta information A and B, and sets $c'_P:=0$ when $c'_P:=c_P$ is not set;

a second processing part that sets $c'_{P+}:=c_{P+}$ when the value according to the acquired corresponding value $a_{1P}b_{2P}+a_{2P}b_{1P}$ is not obtained from the meta information A and B, and sets $c'_{P+}:=0$ when $c'_{P+}:=c_{P+}$ is not set;

a third processing part that sets $r'_P:=r_P$ when the value according to the provided corresponding value $a_{0P}b_{1P}+a_{1P}b_{0P}$ is not obtained from the meta information A and B, and sets $r'_P:=0$ when $r'_P:=r_P$ is not set;

a fourth processing part that sets $r'_{P-}:=r_{P-}$ when the value according to $a_{2P}b_{0P}+a_{0P}b_{2P}$ is not obtained from the meta information A and B, and sets $r'_{P-}:=0$ when $r'_{P-}:=r_{P-}$ is not set;

a fifth processing part that obtains $c_{0P}:=a'_{0P}b'_{1P}+c'_P-r'_{P-}$ when the value according to $a_{2P}b_{0P}+a_{0P}b_{2P}$ is not obtained from the meta information A and B and/or obtains $c_{0P}:=a'_{0P}b'_{1P}+c'_P-r'_{P-}$ when a value according to $a_{0P}b_{0P+}a_{0P}b_{1P}+a_{1P}b_{0P}$ is not obtained from the meta information A and B; and a sixth processing part that obtains $c_{1P}:=a'_{1P}b'_{1P}+c'_{P+}-r'_P$ when the value according to $a_{0P}b_{1P}+a_{1P}b_{0P}$ is not obtained from the meta information A and B and/or obtains $c_{1P}:=a'_{1P}b'_{1P}+c'_{P+}-r'_P$ when a value according to $a_{1P}b_{1P}+a_{1P}b_{2P}+a_{2P}b_{1P}$ is not obtained from the meta information A and B.

7. The secret computation apparatus according to claim 6, wherein the operation part comprises:

a seventh processing part that, when the value according to $a_{0P}b_{0P}+a_{0P}b_{1P}+a_{1P}b_{0P}$ is not obtained from the meta information A and B, sets $C_{0P}:=\perp$ and, when the value according to $a_{0P}b_{0P}+a_{0P}b_{1P+}a_{1P}b_{0P}$ is obtained from the meta information A and B, obtains the value according to $a_{0P}b_{0P+}a_{0P}b_{1P}+a_{1P}b_0$ from the meta information A and B and sets the value as $C_{0P}$;

an eighth processing part that, when the value according to $a_{1P}b_{1P}+a_{1P}b_{2P+}a_{2P}b_{1P}$ is not obtained from the meta information A and B, sets $C_{1P}:=\perp$ and, when the value according to $a_{1P}b_{1P}+a_{1P}b_{2P}+a_{2P}b_{1P}$ is obtained from the meta information A and B, obtains the value according to $a_{1P}b_{1P}+a_{1P}b_{2P}+a_{2P}b_{1P}$ from the meta information A and B and sets the value as $C_{1P}$; and a ninth processing part that, when a value according to $a_{2P}b_{2P}+a_{2P}b_{0P}+a_{0P}b_{2P}$ is not obtained from the meta information A and B, sets $C_{2P}:=\perp$ and, when the value according to $a_{2P}b_{2P+}a_{2P}b_{0P+}a_{0P}b_{2P}$ is obtained from the meta information A and B, obtains the value according to $a_{2P}b_{2P+}a_{2P}b_{0P}+a_{0P}b_{2P}$ from the meta information A and B and sets the value as $C_{2P}$; and $C_{0P}$, $C_{1P}$, $C_{2P}$ are meta information about the secret share value; the secret share value includes $c_{0P}$ in the case of $C_{0P}:=\perp$; and the secret share value includes $c_{1P}$ in the case of $C_{1P}:=\perp$.

8. A secret computation apparatus that obtains a secret share value of an operation result according to an input value, wherein the input value is a function value of a plurality of subshares; and the secret computation apparatus comprises:

a storage that stores an assigned share which is a proper subset of a subshare set with the plurality of subshares as elements, and meta information indicating values according to the elements of the subshare set or indicating that the elements are concealed values; and processing circuitry configured to implement:
an output part that, when a value according to a provided corresponding value according to a subset of the assigned share is not obtained from the meta information, transmits a provided value according to the provided corresponding value obtained from the subset of the assigned share;
an input part to which, when a value according to an acquired corresponding value according to a subset of an external assigned share, which is a proper subset of the subshare set, is not obtained from the meta information, an acquired value according to the acquired corresponding value is inputted; and
an operation part that, when the acquired value is inputted to the input part, obtains the secret share value at least using the acquired value, wherein the operation result is an operation result $\Sigma_{n\in\{0,\ldots,N-1\}}a(n)b(n)$ between the input value $\{a(0),\ldots,a(N-1)\}$ and a second input value $\{b(0),\ldots,b(N-1)\}$, and $N\geq 1$ and $n=0,\ldots,N-1$ are satisfied;

$a(n)$ satisfies $a(n)=a_{0P}(n)+a_{1P}(n)+a_{2P}(n)$ for the subshares $a_{0P}(n), a_{1P}(n), a_{2P}(n)$;

$b(n)$ satisfies $b(n)=b_{0P}(n)+b_{1P}(n)+b_{2P}(n)$ for second subshares $b_{0P}(n), b_{1P}(n), b_{2P}(n)$;

$a'_{0P}(n), a'_{1P}(n), b'_{0P}(n)$ and $b'_{1P}(n)$ are values according to $a_{0P}(n), a_{1P}(n), b_{0P}(n)$ and $b_{1P}(n)$, respectively;

the storage stores the assigned share $(a_{0P}(n), a_{1P}(n))$ which is a proper subset of the subshare set $(a_{0P}(n), a_{1P}(n), a_{2P}(n))$, the meta information A indicating values according to elements of the subshare set $(a_{0P}(n), a_{1P}(n), a_{2P}(n))$ or indicating that the elements are concealed values, a second assigned share $(b_{0P}, b_{1P})$ which is a proper subset of a second subshare set $(b_{0P}(n), b_{1P}(n), b_{2P}(n))$, and second meta information B indicating values according to elements of the second subshare set $(b_{0P}(n), b_{1P}(n), b_{2P}(n))$ or indicating that the elements are concealed values;

the secret computation apparatus comprises processing circuitry configured to implement:

a first sharing part that, when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B, performs communication for sharing a first arbitrary value $r_{P-}$ with an external first secret computation apparatus; and a second sharing part that, when the value according to $\Sigma_{n\in\{0,\ldots,N-1\}}\{a_{2P}(n)b_{0P}(n)+a_{0P}(n)b_{2P}(n)\}$ is not obtained from the meta information A and B, performs communication for sharing a second arbitrary value $r_{P-}$ with an external second secret computation apparatus;

when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B, the output part transmits the provided value $c_P:=\Sigma_{n\in\{0,\ldots,N-1\}}\{a_{0P}(n)b_{1P}(n)+a_{1P}(n)b_{0P}(n)\}+r_P$ to the second secret computation apparatus;

when the value according to the acquired corresponding value $\Sigma_{n\in\{0,\ldots,N-1\}}\{a_{1P}(n)b_{2P}(n)+a_{2P}(n)b_{1P}(n)\}$ is not obtained from the meta information A and B, the input part receives the acquired value $c_{P+}$ transmitted from the first secret computation apparatus; and the operation part comprises:

a first processing part that sets $c'_P:=c_P$ when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B, and sets $c'_P:=0$ when $c'_P:=c_P$ is not set;

a second processing part that sets $c'_{P+}:=c_{P+}$ when the value according to the acquired corresponding value $\Sigma_{n\in\{0,\ldots,N-1\}}\{a_{1P}(n)b_{2P}(n)+a_{2P}(n)b_{1P}(n)\}$ is not obtained from the meta information A and B, and sets $c'_{P+}:=0$ when $c'_{P+}:=c_{P+}$ is not set;

a third processing part that sets $r'_P:=r_P$ when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B, and sets $r'_P:=0$ when $r'_P:=r_P$ is not set;

a fourth processing part that sets $r'_{P-}:=r_{P-}$ when the value according to $\Sigma_{n\in\{0,\ldots,N-1\}}\{a_{2P}(n)b_{0P}(n)+a_{0P}(n)b_{2P}(n)\}$ is not obtained from the meta information A and B, and sets $r'_{P-}:=0$ when $r'_{P-}:=r_{P-}$ is not set;

a fifth processing part that obtains $c_{0P}:=\Sigma_{n\in\{0,\ldots,N-1\}}a_{0P}((n)b'_{1P}(n)+c'_P-r'_{P-}$ when the value according to $\Sigma_{n\in\{0,\ldots,N-1\}}\{a_{2P}(n)b_{0P}(n)+a_{0P}(n)b_{2P}(n)\}$ is not obtained from the meta information A and B and/or obtains $c_{0P}:=\Sigma_{n\in\{0,\ldots,N-1\}}a_{0P}(n)b'_{1P}(n)+c'_P-r'_{P-}$ when a value according to $\Sigma_{n\in\{0,\ldots,N-1\}}\{a_{0P}(n)b_{0P}(n)+a_{0P}(n)b_{1P}(n)+a_{1P}(n)b_{0P}(n)\}$ is not obtained from the meta information A and B; and a sixth processing part that obtains $c_{1P}:=\Sigma_{n\in\{0,\ldots,N-1\}}a'_{1P}(n)b'_{1P}(n)+c'_{P+}-r'_P$ when the value according to $\Sigma_{n\in\{0,\ldots,N-1\}}\{a_{0P}(n)b_{1P}(n)+a_{1P}(n)b_{0P}(n)\}$ is not obtained from the meta information A and B and/or obtains $c_{1P}:=\Sigma_{n\in\{0,\ldots,N-1\}}a'_{1P}(n)b'_{1P}(n)+c'_{P+}-r'_P$ when a value according to $\Sigma_{n\in\{0,\ldots,N-1\}}\{a_{1P}(n)b_{1P}(n)+a_{1P}(n)b_{2P}(n)+a_{2P}(n)b_{1P}(n)\}$ is not obtained from the meta information A and B.

9. The secret computation apparatus according to claim 8, wherein the operation part comprises:

a seventh processing part that sets $C_{0P}:=\perp$ when the value according to $\Sigma_{n\in\{0,\ldots,N-1\}}\{a_{0P}(n)b_{0P}(n)+a_{0P}(n)b_{1P}(n)+a_{1P}(n)b_{0P}(n)\}$ is not obtained from the meta information A and B, and, when the value according to $\Sigma_{n\in\{0,\ldots,N-1\}}\{a_{0P}(n)b_{0P}(n)+a_{0P}(n)b_{1P}(n)+a_{1P}(n)b_{0P}(n)\}$ is obtained from the meta information A and B, obtains the value according to $\Sigma_{n\in\{0,\ldots,N-1\}}\{a_{0P}(n)b_{0P}(n)+a_{0P}(n)b_{1P}(n)+a_{1P}(n)b_{0P}(n)\}$ from the meta information A and B and sets the value as $C_{0P}$;

an eighth processing part that sets $C_{1P}:=\perp$ when the value according to $\Sigma_{n\in\{0,\ldots,N-1\}}\{a_{1P}(n)b_{1P}(n)+a_{1P}(n)b_{2P}(n)+a_2(n)b_{1P}(n)\}$ is not obtained from the meta information A and B, and, when the value according to $\Sigma_{n\in\{0,\ldots,N-1\}}\{a_{1P}(n)b_{0P}(n)+a_{1P}(n)b_{2P}(n)+a_2(n)b_{1P}(n)\}$ is obtained from the meta information A and B, obtains the value according to $\Sigma_{n\in\{0,\ldots,N-1\}}\{a_{1P}(n)b_{1P}(n)+a_{1P}(n)b_{2P}(n)+a_{2P}(n)b_{1P}(n)\}$ from the meta information A and B and sets the value as $C_{1P}$;

a ninth processing part that sets $C_{2P}:=\perp$ when a value according to $\Sigma_{n\in\{0,\ldots,N-1\}}\{a_{2P}(n)b_{2P}(n)+a_{2P}(n)b_{0P}(n)+a_{0P}(n)b_{2P}(n)\}$ is not obtained from the meta information A and B, and, when the value according to $\Sigma_{n\in\{0,\ldots,N-1\}}\{a_{2P}(n)b_{2P}(n)+a_{2P}(n)b_{0P}(n)+a_{0P}(n)b_{2P}(n)\}$ is obtained, obtains the value according to $\Sigma_{n\in\{0,\ldots,N-1\}}\{a_{2P}(n)b_2(n)+a_2(n)b_{0P}(n)+a_{0P}(n)b_{2P}(n)\}$ from the meta information A and B and sets the value as $C_{2P}$; and $C_{0P}, C_{1P}, C_{2P}$ are meta information about the secret share value; the secret share value includes $c_{0P}$ in the case of $C_{0P}:=\perp$; and the secret share value includes $c_{1P}$ in the case of $C_{1P}:=\perp$.

10. A non-transitory computer-readable recording medium storing a program for causing a computer to function as the secret computation apparatus according to any one of claims 1 to 4.

11. A secret computation method for obtaining a secret share value of an operation result according to an input value, wherein
the input value is a function value of a plurality of subshares;
an assigned share which is a proper subset of a subshare set with the plurality of subshares as elements, and meta information indicating values according to the elements of the subshare set or indicating that the elements are concealed values are stored in a storage; and
the method comprises the steps of:
when a value according to a provided corresponding value according to a subset of the assigned share is not obtained from the meta information, an output part transmitting a provided value according to the provided corresponding value obtained from the subset of the assigned share;
when a value according to an acquired corresponding value according to a subset of an external assigned share, which is a proper subset of the subshare set, is not obtained from the meta information, an acquired value according to the acquired corresponding value being inputted to an input part; and
an operation part obtaining the secret share value at least using the acquired value when the acquired value is inputted to the input part, wherein
the operation result is a multiplication result between the input value a and the second input value b;
the input value a satisfies $a = a_{0P} + a_{1P} + a_{2P}$ for the subshares $a_{0P}, a_{1P}, a_{2P}$;
the second input value b satisfies $b = b_{0P} + b_{1P} + b_{2P}$ for second subshares $b_{0P}, b_{1P}, b_{2P}$;
$a'_{0P}, a'_{1P}, b'_{0P}$ and $b'_{1P}$ are values according to $a_{0P}, a_{1P}, b_{0P}$ and $b_{1P}$, respectively;
the storage (111-P) stores the assigned share $(a_{0P}, a_{1P})$ which is a proper subset of the subshare set $(a_{0P}, a_{1P}, a_{2P})$, the meta information A indicating values according to elements of the subshare set $(a_{0P}, a_{1P}, a_{2P})$ or indicating that the elements are concealed values, a second assigned share $(b_{0P}, b_{1P})$ which is a proper subset of a second subshare set $(b_{0P}, b_{1P}, b_{2P})$, and second meta information B indicating values according to elements of the second subshare set $(b_{0P}, b_{1P}, b_{2P})$ or indicating that the elements are concealed values;
a secret computation apparatus (11-P) comprises:
a first sharing part (114-P) that, when the value according to the provided corresponding value $a_{0P}b_{1P} + a_{1P}b_{0P}$ is not obtained from the meta information A and B, performs communication for sharing a first arbitrary value $r_P$ with an external first secret computation apparatus (11-P$_+$); and
a second sharing part (114-P) that, when a value according to $a_{2P}b_{0P} + a_{0P}b_{2P}$ is not obtained from the meta information A and B, performs communication for sharing a second arbitrary value $r_{P-}$ with an external second secret computation apparatus (11-P$_-$);
when the value according to the provided corresponding value $a_{0P}b_{1P} + a_{1P}b_{0P}$ is not obtained from the meta information A and B, the output part (115-P) transmits the provided value $c_P := a_{0P}b_{1P} + a_{1P}b_{0P} + r_P$ to the second secret computation apparatus (11-P$_-$);

when the value according to the acquired corresponding value $a_{1P}b_{2P} + a_{2P}b_{1P}$ is not obtained from the meta information A and B, the acquired value $c_{P+}$ transmitted from the first secret computation apparatus (11-P$_|$) is inputted to the input part (115-P); and
the operation part (112-P) comprises:
a first processing part (1121-P) that sets $c'_P := c_P$ when the value according to the provided corresponding value $a_{0P}b_{1P} + a_{1P}b_{0P}$ is not obtained from the meta information A and B, and sets $c'_P := 0$ when $c'_P := c_P$ is not set;
a second processing part (1122-P) that sets $c'_{P+} := c_{P+}$ when the value according to the acquired corresponding value $a_{1P}b_{2P} + a_{2P}b_{1P}$ is not obtained from the meta information A and B, and sets $c'_{P+} := 0$ when $c'_{P+} := c_{P+}$ is not set;
a third processing part (1123-P) that sets $r'_P := r_P$ when the value according to the provided corresponding value $a_{0P}b_{1P} + a_{1P}b_{0P}$ is not obtained from the meta information A and B, and sets $r'_P := 0$ when $r'_P := r_P$ is not set;
a fourth processing part (1124-P) that sets $r'_{P-} := r_{P-}$ when the value according to $a_{2P}b_{0P+}a_{0P}b_{2P}$ is not obtained from the meta information A and B, and sets $r'_{P-} := 0$ when $r'_{P-} := r_{P-}$ is not set;
a fifth processing part (1125-P) that obtains $C_{0P} := a'_{0P}b'_{1P} + c'_P - r'_{P-}$ when the value according to $a_{2P}b_{0P} + a_{0P}b_{2P}$ is not obtained from the meta information A and B and/or obtains $c_{0P} := a'_{0P}b'_{1P} + c'_P - r'_{P-}$ when a value according to $a_{0P}b_{0P} + a_{0P}b_{1P} + a_{1P}b_{0P}$ is not obtained from the meta information A and B; and
a sixth processing part (1126-P) that obtains $c_{1P} := a'_{1P}b'_{1P} + c'_{P+} - r'_P$ when the value according to $a_{0P}b_{1P} + a_{1P}b_{0P}$ is not obtained from the meta information A and B and/or obtains $c_{1P} := a'_{1P}b'_{1P} + c'_{P+} - r'_P$ when a value according to $a_{1P}b_{1P} + a_{1P}b_{2P} + a_{2P}b_{1P}$ is not obtained from the meta information A and B.

12. A secret computation method for obtaining a secret share value of an operation result according to an input value, wherein
the input value is a function value of a plurality of subshares;
an assigned share which is a proper subset of a subshare set with the plurality of subshares as elements, and meta information indicating values according to the elements of the subshare set or indicating that the elements are concealed values are stored in a storage; and
the method comprises the steps of:
when a value according to a provided corresponding value according to a subset of the assigned share is not obtained from the meta information, an output part transmitting a provided value according to the provided corresponding value obtained from the subset of the assigned share;
when a value according to an acquired corresponding value according to a subset of an external assigned share, which is a proper subset of the subshare set, is not obtained from the meta information, an acquired value according to the acquired corresponding value being inputted to an input part; and
an operation part obtaining the secret share value at least using the acquired value when the acquired value is inputted to the input part, wherein
the operation result is an operation result $\Sigma_{n \in \{0, \ldots, N-1\}} a(n)b(n)$ between the input value $\{a(0), \ldots, a(N-1)\}$ and a second input value $\{b(0), \ldots, b(N-1)\}$, and $N \geq 1$ and $n = 0, \ldots, N-1$ are satisfied;

$a(n)$ satisfies $a(n)=a_{0P}(n)+a_{1P}(n)+a_{2P}(n)$ for the subshares $a_{0P}(n)$, $a_{1P}(n)$, $a_{2P}(n)$;

$b(n)$ satisfies $b(n)=b_{0P}(n)+b_{1P}(n)+b_{2P}(n)$ for second subshares $b_{0P}(n)$, $b_{1P}(n)$, $b_{2P}(n)$;

$a'_{0P}(n)$, $a'_{1P}(n)$, $b'_{0P}(n)$ and $b'_{1P}(n)$ are values according to $a_{0P}(n)$, $a_{1P}(n)$, $b_{0P}(n)$ and $b_{1P}(n)$, respectively;

the storage (211-P) stores the assigned share ($a_{0P}(n)$, $a_{1P}(n)$) which is a proper subset of the subshare set ($a_{0P}(n)$, $a_{1P}(n)$, $a_{2P}(n)$), the meta information A indicating values according to elements of the subshare set ($a_{0P}(n)$, $a_{1P}(n)$, $a_{2P}(n)$) or indicating that the elements are concealed values, a second assigned share ($b_{0P}$, $b_{1P}$) which is a proper subset of a second subshare set ($b_{0P}(n)$, $b_{1P}(n)$, $b_{2P}(n)$), and second meta information B indicating values according to elements of the second subshare set ($b_{0P}(n)$, $b_{1P}(n)$, $b_{2P}(n)$) or indicating that the elements are concealed values;

a secret computation apparatus (21-P) comprises:

a first sharing part (214-P) that, when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B, performs communication for sharing a first arbitrary value $r_P$ with an external first secret computation apparatus (21-$P_+$); and a second sharing part (214-P) that, when the value according to $\Sigma_{n\in\{0,\ldots,N-1\}}\{a_{2P}(n)b_{0P}(n)+a_{0P}(n)b_{2P}(n)\}$ is not obtained from the meta information A and B, performs communication for sharing a second arbitrary value $r_{P_-}$ with an external second secret computation apparatus (21-$P_-$);

when the value according to the provided corresponding value $\Sigma_{n\in\{0,\ldots,N-1\}}\{a_{0P}(n)b_P)+(n)+a_{1P}(n)b_{0P}(n)\}$ is not obtained from the meta information A and B, the output part (215-P) transmits the provided value $c_P:=\Sigma_{n\in\{0,\ldots,N-1\}}\{a_{0P}(n)b_{1P}(n)+a_{1P}(n)b_{0P}(n)\}+r_P$ to the second secret computation apparatus (21-$P_-$);

when the value according to the acquired corresponding value $\Sigma_{n\in\{0,\ldots,N-1\}}\{a_{1P}(n)b_{2P}(n)+a_{2P}(n)b_{1P}(n)\}$ is not obtained from the meta information A and B, the acquired value $c_{P_+}$ transmitted from the first secret computation apparatus (21-$P_+$) is inputted to the input part (215-P); and the operation part (212-P) comprises:

a first processing part (2121-P) that sets $c'_P:=c_P$ when the value according to the provided corresponding value $\Sigma_{n\in\{0,\ldots,N-1\}}\{a_{0P}(n)b_{1P}(n)+a_{1P}(n)b_{0P}(n)\}$ is not obtained from the meta information A and B, and sets $c'_P:=0$ when $c'_P:=c_P$ is not set;

a second processing part (2122-P) that sets $c'_{P+}:=c_{P+}$ when the value according to the acquired corresponding value $\Sigma_{n\in\{0,\ldots,N-1\}}\{a_{1P}(n)b_{2P}(n)+a_{2P}(n)b_{1P}(n)\}$ is not obtained from the meta information A and B, and sets $c'_{P+}:=0$ when $c'_{P+}:=c_{P+}$ is not set;

a third processing part (2123-P) that sets $r'_P:=r_P$ when the value according to the provided corresponding value $\Sigma_{n\in\{0,\ldots,N-1\}}\{a_{0P}(n)b_P(n)+a_{1P}(n)b_{0P}(n)\}$ is not obtained from the meta information A and B, and sets $r'_P:=0$ when $r'_P:=r_P$ is not set;

a fourth processing part (2124-P) that sets $r'_{P-}:=r_{P-}$ when the value according to $\Sigma_{n\in\{0,\ldots,N-1\}}\{a_{2P}(n)b_{0P}(n)+a_{0P}(n)b_{2P}(n)\}$ is not obtained from the meta information A and B, and sets $r'_{P-}:=0$ when $r'_{P-}:=r_{P-}$ is not set;

a fifth processing part (2125-P) that obtains $c_{0P}:=\Sigma_{n\in\{0,\ldots,N-1\}}a_{0P}(n)b_{1P}(n)+c'_P-r'_{P-}$ when the value according to $\Sigma_{n\in\{0,\ldots,N-1\}}\{a_{2P}(n)b_{0P}(n)+a_{0P}(n)b_{2P}(n)\}$ is not obtained from the meta information A and B and/or obtains $c_{0P}:=\Sigma_{n\in\{0,\ldots,N-1\}}a_{0P}(n)b'_{1P}(n)+c'_P-r'_{P-}$ when a value according to $\Sigma_{n\in\{0,\ldots,N-1\}}\{a_{0P}(n)b_{0P}(n)+a_{0P}(n)b_{1P}(n)+a_{1P}(n)b_{0P}(n)\}$ is not obtained from the meta information A and B; and a sixth processing part (2126-P) that obtains $c_{1P}:=\Sigma_{n\in\{0,\ldots,N-1\}}a'_{1P}(n)b'_{1P}(n)+c'_{P+}-r'_P$ when the value according to $\Sigma_{n\in\{0,\ldots,N-1\}}\{a_{0P}(n)b_{1P}(n)+a_{1P}(n)b_{0P}(n)\}$ is not obtained from the meta information A and B and/or obtains $c_{1P}:=\Sigma_{n\in\{0,\ldots,N-1\}}a'_{1P}(n)b'_{1P}(n)+c'_{P|}-r'_P$ when a value according to $\Sigma_{n\in\{0,\ldots,N-1\}}\{a_{1P}(n)b_{1P}(n)+a_{1P}(n)b_{2P}(n)+a_{2P}(n)b_{1P}(n)\}$ is not obtained from the meta information A and B.

* * * * *